United States Patent
Takase et al.

[11] Patent Number: 5,822,535
[45] Date of Patent: Oct. 13, 1998

[54] NETWORK MANAGEMENT AND DATA COLLECTION SYSTEM

[75] Inventors: Kohichi Takase; Hideyuki Matsuda, both of Kawasaki, Japan

[73] Assignee: Fujitsu Limited, Kanagawa, Japan

[21] Appl. No.: 615,631

[22] Filed: Mar. 13, 1996

[30] Foreign Application Priority Data

Mar. 20, 1995 [JP] Japan .................................. 7-061370

[51] Int. Cl.[6] .................................................. G06F 13/10
[52] U.S. Cl. .............................. 395/200.56; 395/200.53
[58] Field of Search ..................... 395/200.53, 200.56, 395/200.65, 200.63, 200.55, 200.47, 200.64

[56] References Cited

U.S. PATENT DOCUMENTS

| | | | |
|---|---|---|---|
| 5,095,444 | 3/1992 | Motles | 364/514 |
| 5,491,801 | 2/1996 | Jain | 395/200.13 |
| 5,598,532 | 1/1997 | Liron | 395/200.01 |

FOREIGN PATENT DOCUMENTS

| | | |
|---|---|---|
| 63-69346 | 3/1988 | Japan . |
| 63-311833 | 12/1988 | Japan . |
| 5191405 | 7/1993 | Japan . |
| 662019 | 3/1994 | Japan . |

*Primary Examiner*—Eric Coleman
*Attorney, Agent, or Firm*—Helfgott & Karas, PC.

[57] ABSTRACT

In a network management and data collection system, a management node specifies suitable numbers of accumulated data and sends inquiry packets, and managed nodes collect data required for the above-described accumulated numbers with the specified time interval. Then, the managed nodes compiles the collected and accumulated data into a response packet, and sends the data to the management node. With the system, the number of the response packets can be reduced, and further, this can prevent inquiry and response packets from being concentrated and flowing to a network at once.

9 Claims, 19 Drawing Sheets

FIG. 13

[CHART B]

| NAME OF<br>MANAGED OBJECT DEVICE<br>(F) | PRINTER 1 | PRINTER 2 | COMMUNICATION<br>CONTROL MODULE 350 |
|---|---|---|---|
| MANAGING MANAGED NODE<br>(G) | 301 | 301 | 301 |
| CONTEXT FOR GENERATING<br>EACH DEVICE<br>(H) | LASER<br>100 | INK<br>EXIST<br>NOTHING | IP 10 MPS<br>NORMAL<br>0 |
| | ------ | ------ | ------ |

FIG. 15

|  | (HEADING INDIVIDUAL SECTION) | | | (LAST INDIVIDUAL SECTION) |
|---|---|---|---|---|
| | ⎧ (I) | | | (II) ⎫ |
| (A) NAME OF MANAGED NODE | 301 | 302 | 303 | 304 |
| (B) LOGICAL ADDRESS | ADDRESS OF 301 | ADDRESS OF 302 | ADDRESS OF 303 | ADDRESS OF 304 |
| (C) CONTEXT FOR SETTING CALLS | 7<br>AP1<br>... | 7<br>AP2<br>... | 7<br>AP3<br>... | 5<br>AP4<br>... |
| (D) GROUP NUMBER | | | | |
| PROCESSING CONDITION | INVALID VALUE | INVALID VALUE | NORMAL | NORMAL |
| SHIFTING FROM INTERVAL | 1/4 X T | 1/2 X T | 0 | 0 |
| HEADING ACCUMULATED CIRCUIT | 1/4 X A | 1/2 X A | 0 | 0 |
| MIDDLE ACCUMULATED CIRCUIT | A | A | A | A |
| LAST ACCUMULATED CIRCUIT | 3/4*A+R | 1/2*A+R | R | R |
| NUMBERS OF INQUIRIES | N-1 | N-1 | N | N |
| FIRST COLLECTION INTERVAL | 0 | 0 | 0 | 0 |
| COUNTER FOR OPERATION | -------- | -------- | -------- | -------- |

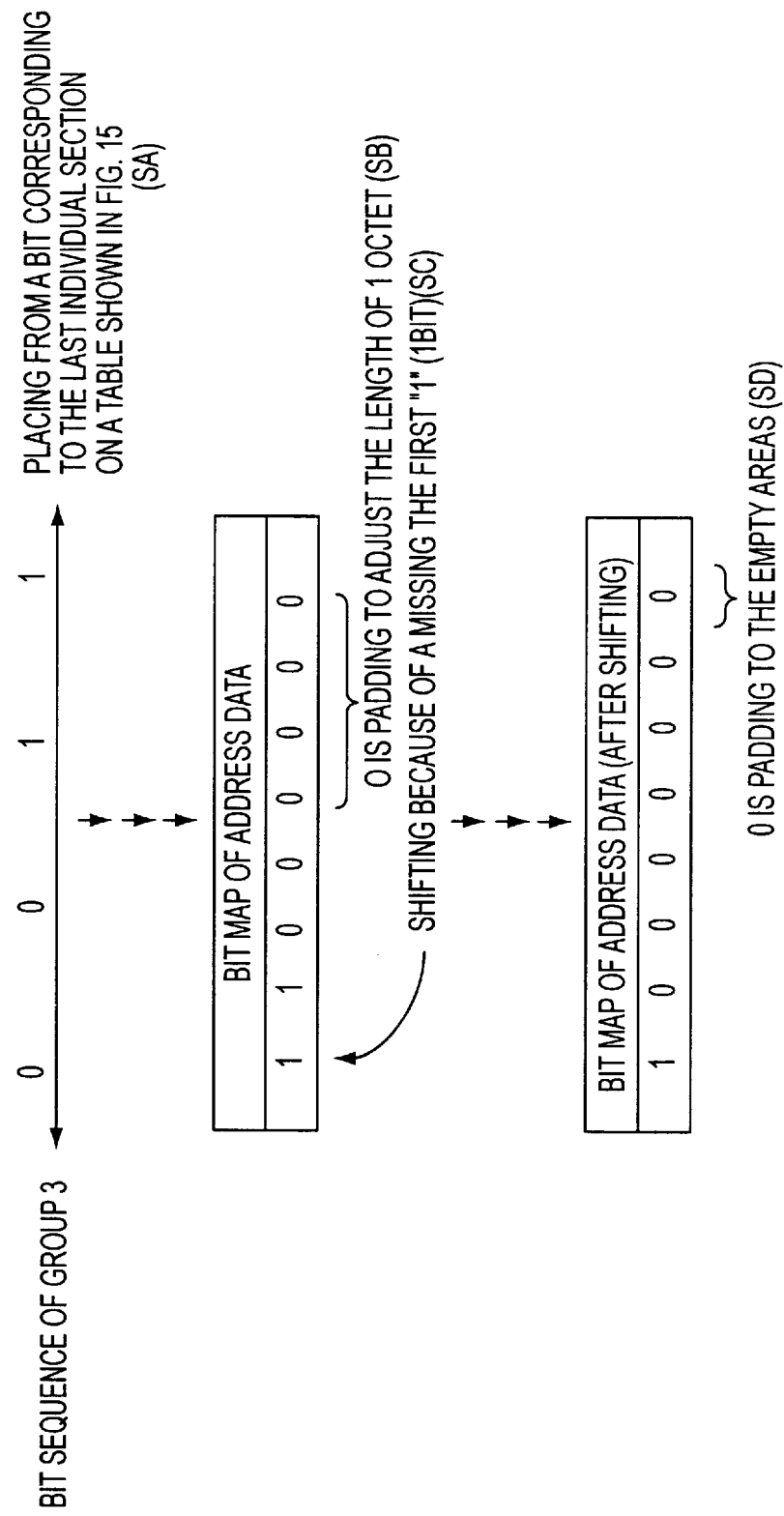

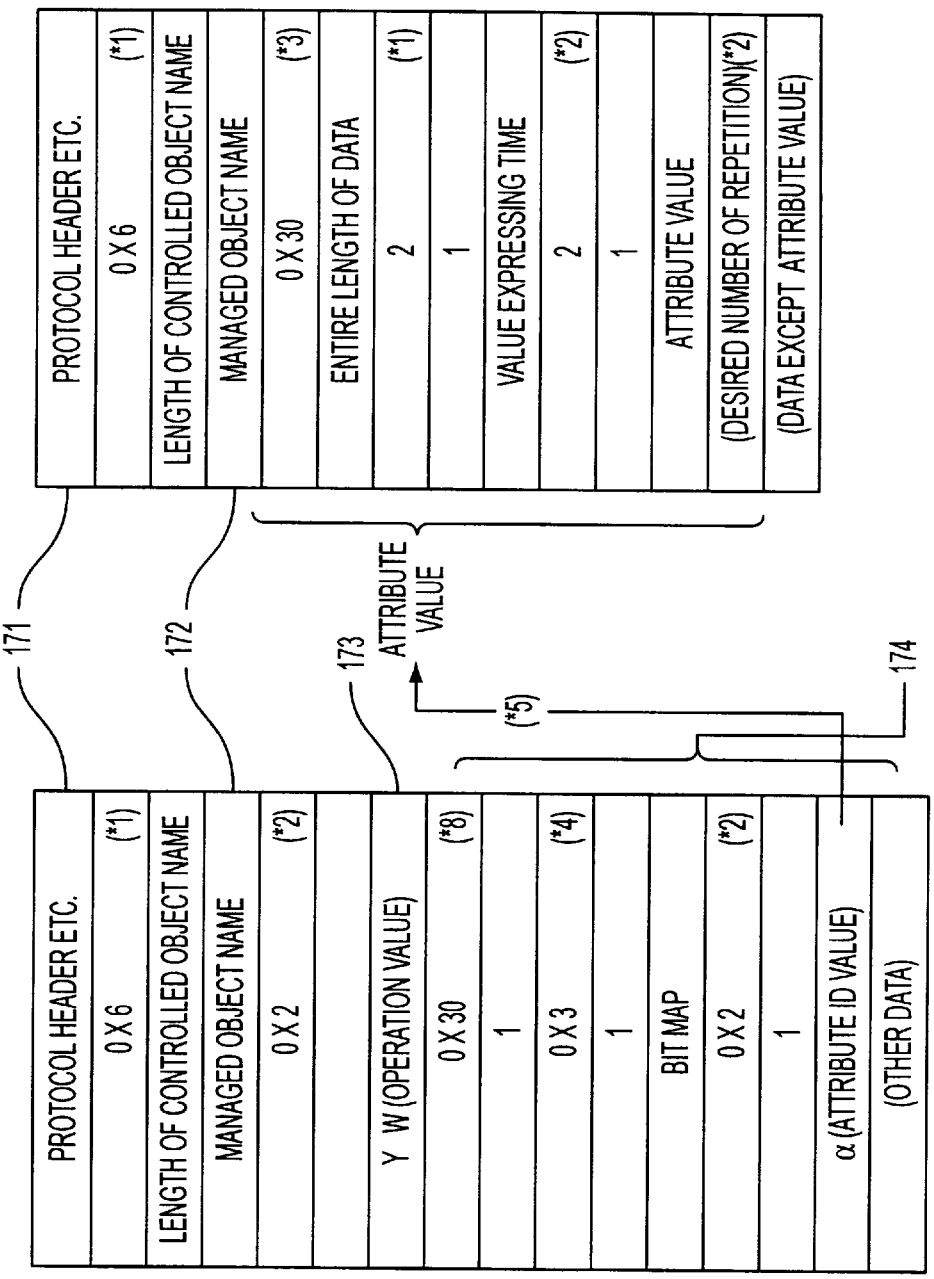
FIG. 17B (RESPONSE)
FIG. 17A (REQUEST)

NETWORK MANAGEMENT AND DATA COLLECTION SYSTEM

BACKGROUND OF THE INVENTION

1. Field of the Invention

The present invention relates to a network management system, which is formed with an information processing device or a communication device provided in a line network, and more particularly, to a network management and data collection system, which collects management information of devices connected to a managed node from the managed node.

2. Description of the Related Art

Data collecting system of basic data, such as maintenance information or the like on a network of the conventional WAN (Wide Area Network)/LAN (Local Area Network) will be explained in accompanying to FIGS. 18 and 19.

In FIG. 18, a network 200 (line network) is connected with a management node 100 and a plurality of managed node 300 (for simplicity, only a managed node is shown in FIG. 18). Further, a plurality of monitored object devices 310 are connected to the managed node 300 (similarly, only a monitored object device is shown in FIG. 18).

The management node 100 sends information for specifying inquiry of management data to the managed node 300 via the network 200, for example, the inquiry of management data is corresponding to m-GET in $Q_x$, interface. Hereinafter, it is so-called as an Inquiry Packet IP.

The above-described inquiry packet IP includes a name a of the managed object device 310, which, hereinafter is referred to as a managed object name, a name b of the collected object data in the appropriate device 310, which, hereinafter, is so-called as an attribute name, an identifier c of the inquiry packet IP, which, hereinafter, is so-called as an Invoke ID, and so on.

The managed node 300, which receives the above-described inquiry packet IP, collects data corresponding to the device name a and the attribute name b, which, hereinafter, is referred to as an attribute value, and attaches the invoke ID in the packet and collection time, hereinafter called as the present time d to edit the data.

The edited data is sent to the management node 100 via a channel network 200 as a response for an inquiry packet, hereinafter, the data, which is sent as a response, is so-called to as a response packet RP.

The management node 100, which receives the above-described response packet RP, judges to which inquiry packet is corresponding, according to the invoke ID, and stores the attribute value on a predetermined position, for example, an auxiliary storage. In this way, data collection may be completed.

A managed object device 310 of a CPU or a printer provided in the managed node can be as well as peripheral equipment, such as a communication controller.

When a LAN is connected to a WAN, it is required to set or release a logical connection, which is recognized by a program, as a previous or a trailing processing for data transmission. Hereinafter, the connection is so-called as a call.

Conventional systems for effectively performing the previous or trailing processing for data transmission, which have been proposed before, will be now explained as follows:

A conventional system described in Japanese Unexamined Patent Publication No. Sho 62-234442 is that an auxiliary storage accumulates data relating to a data processing unit connected via a WAN (Wide Area Network), in order to dialing according to the data.

Another conventional system described in Japanese Unexamined Patent Publication No. Hei 5-153121 is that calls can be kept and monitored regularly and economically, even if they are connected between WANs for circuit switching, by managing another managed node via the managed node having a plurality of ports, which are resource for setting calls, and tutoring its structure of the connection.

Further, in a system management of OSI (Open System Interconnection), the managed object devices are defined on a basis of a object-directed modeling method. A structure of the management information is standardized as a description form on ISO/IEC DP 10165-1,2,3.

A system for composing the management data structure (Management Information Base: MIB) is described in Japanese Unexamined Patent Publication No. Hei 4-84249. In the system, data pattern and each managed object address are tabled to retrieve the object for communication.

Collection of the management data based on each of the above-described systems will be explained as follows. For example, if an application user of the management node requests for periodically obtaining data during a predetermined suitable interval, for example, at a 10 second interval, the managed node 300 periodically generates an inquiry packet IP sent from the management node 100, regardless of load condition in the network, and the corresponding response packet RP.

An interface, which specifies middle/end portion of a response with the use of a protocol named m-Linked-Reply and abbreviates re-inquiry, exists in a $Q_x$, interface. However, response packets RP required for numbers for collection are generated.

When there are a plurality of inquiry objects due to the request of the above-described application user, which, hereinafter, is referred to as a broadcast, that brings a problem that inquiry packets IP and the corresponding response packets RP are concentrated on the timing of the above-described interval and are flowing into the network.

In this case, network load becomes larger. The increase of network load causes a bad influence, such as a delay of other communication.

SUMMARY OF THE INVENTION

Accordingly, it is an object of the present invention to provide a network management and data collection system to solve the above-described conventional problem.

To obtain the above-described object, in the network management and data collection system according to the present invention, a management node 100 specifies suitable accumulated numbers and sends inquiry packets, and managed nodes 300 collect data required for the above-described accumulated numbers with the specified time interval. After that, the managed node 300 compiles the collected and accumulated data into a response packet, and sends the data to the management node.

With this system, the number of the response packets can be reduced, and further, this can solve the above-described problem that the inquiry packets IP and the response packet RP are concentrated at once and are flowing to the network.

Further, in the network management and data collection system according to the present invention, the managed node can delete attribute values after the second value and edits the response packets, when the data of the continuously identical attribute values are arranged, in the case where the managed node compiles the accumulated data into a response packet. After then, the management node, which receives the response packet, refers current time attached to the attribute value, and restores the deleted data.

Thereby, the amount of data flowing to the network can be reduced.

In the network management and data collection system according to the present invention, the managed node monitors the load condition of its own network equipment in advance. If the load is large on the time of sending the response packets, the managed node puts off the edition, continues accumulating until the load is reduced, re-edits on the time of reducing the load, and sends the response packets to the management node.

Therefore, the data amount flowing to the network can be reduced, and further, the concentration of network load can be prevented.

Furthermore, in the network management and data collection system according to the present invention, the management node sets each different value per an inquiry as an accumulated number on the above-described method, for an inquiry request of the broadcast, described in the problem.

Accordingly, it becomes possible to suitably diverse the times when the response packet is sent from the managed node.

In the network management and data collection system according to the present invention, the inquiry packets are sent and received between the managed nodes, which send the response packets under the suitable diversion. Further, the response packets are also sent and received between the managed nodes, which transmit the inquiry packets to subsequently add each of the accumulated data. At last, only a response packet sent from the last managed node is sent to the managed node.

Therefore, it becomes possible to prevent from concentrating the response packets sent to the management node.

BRIEF DESCRIPTION OF THE DRAWINGS

FIG. 13 illustrates a second table file of a managed node.

FIG. 15 is an explanatory diagram of tabling a managed node file.

FIG. 16 is an explanatory diagram of a procedure for creating a bit map.

FIGS. 17A and 17B are explanatory diagrams of a data format of inquiry and response packets according to the present invention.

DESCRIPTION OF THE PREFERRED EMBODIMENTS

Figure 1:
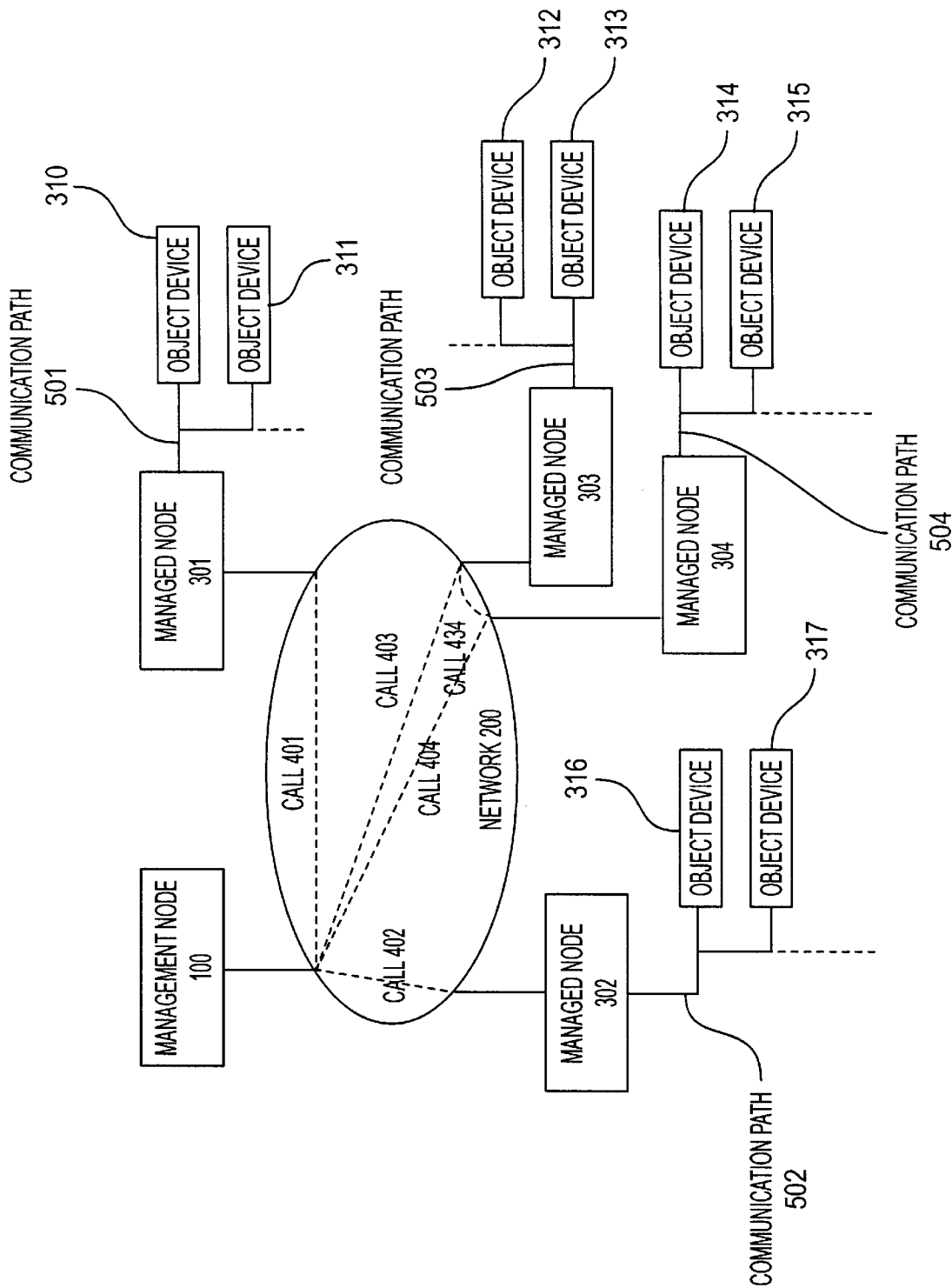
FIG. 1 shows an example of a network structure according to the present invention.

Hereinafter, preferred embodiments of the present invention will be explained in accompanying with the attached drawings. Throughout the following descriptions, the same reference numerals are used to denote and identify corresponding or identical components.

[EXPLANATION OF A STRUCTURAL BLOCK DIAGRAM OF THE PRESENT EMBODIMENT]

FIG. 1 is a block diagram showing an example of a network structure according to the present invention. The network 200 includes a management node 100, and a plurality of managed nodes 301 to 304. Further, a plurality of managed object devices 310 to 317 are connected to each of the managed nodes 301 to 304, as four nodes are shown in the diagram.

Figure 2:
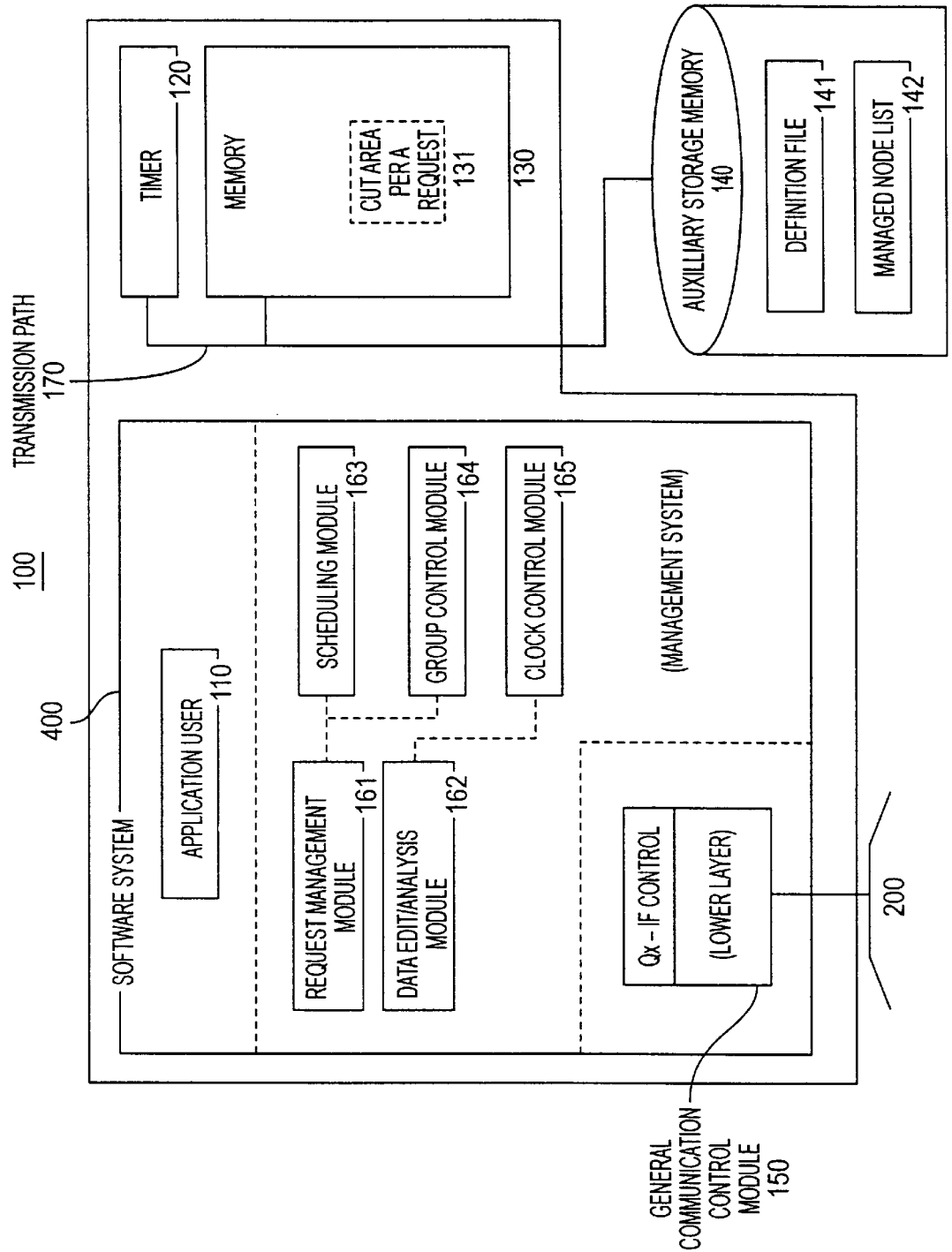
FIG. 2 shows a structural block diagram of the management node 100 shown in FIG. 1.
Figure 3:
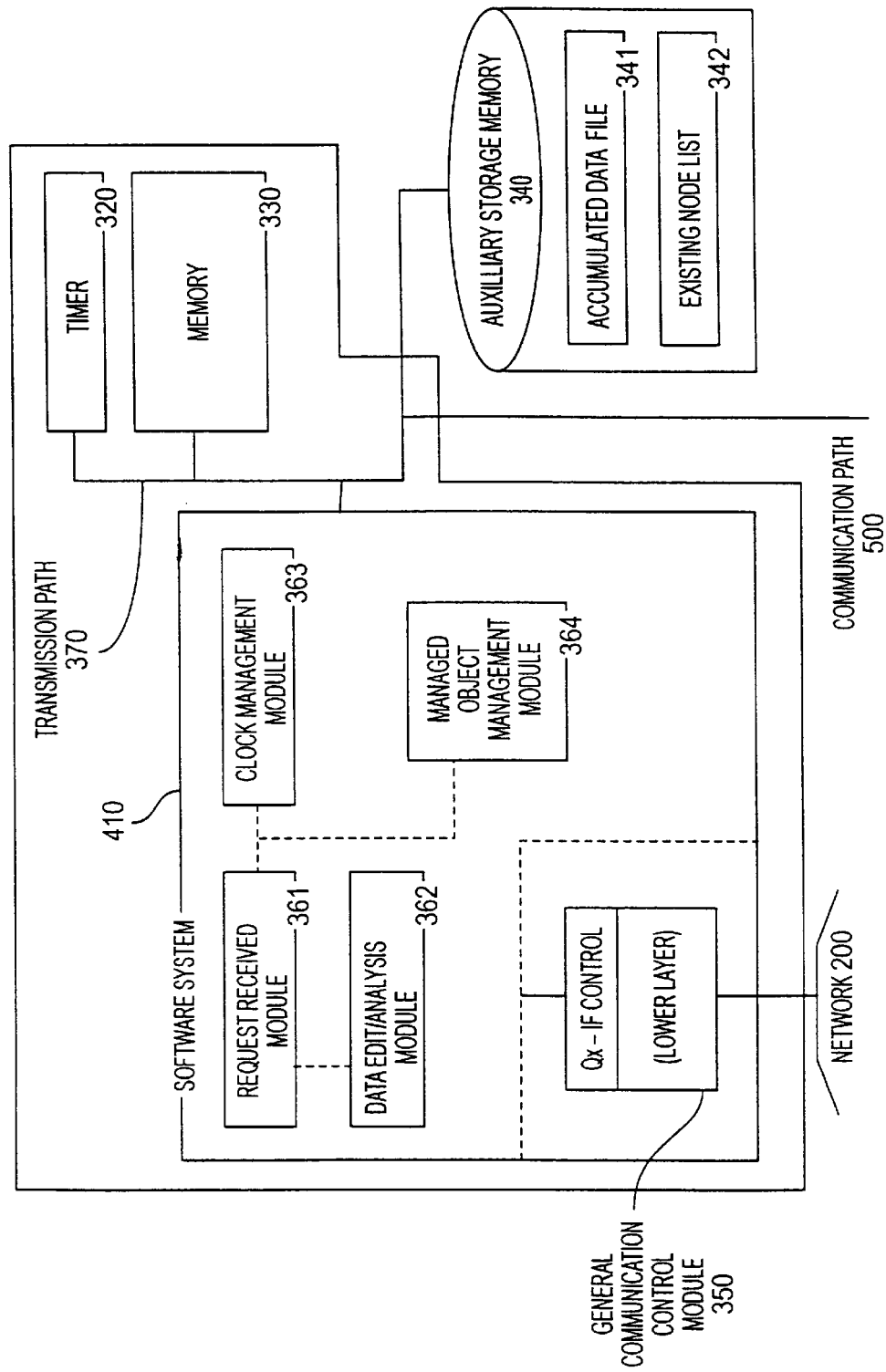
FIG. 3 is a structural block diagram of the managed node 300 shown in FIG. 1.

FIG. 2 shows a structural example of a module of the management node 100. FIG. 3 shows a structural example of a module of the managed node 300, and hereinafter, the managed node is expressed as a reference numeral 300 on behalf of the managed nodes 301 to 304 shown in FIG. 1.

Referring back to FIG. 1, managed nodes 303 and 304 selected from the managed nodes 301 to 304 can be logically connected by a call 434 according to a condition, i.e., a group management control, which is later discussed. Further, in the present invention, there is no case where only two nodes selected from the four managed nodes 301 to 304 can be logically connected. However, the present embodiment will be explained with the above-described structure for simplicity.

In FIGS. 2 and 3, the management node 100 and the managed node 300 are respectively constructed by software systems 400, 410, timers 120, 320, memories 130, 330, and transmission paths 170 and 370, which connect the software systems 400, 410, the timers 120, 320 and the memories 130.

External auxiliary memories 140, 340 are connected to the management and managed nodes 200, 300 by the transmission paths 170, 370, respectively. More particularly, the managed node 300 is also connected to the corresponding managed object devices 310 to 317 via the communication path 500.

Both the management node 100 and the managed node 300 have general communication control modules 150, 350 in the software systems 400, 410. Further, the nodes 100, 300 send and receive to a network 200 according to a request sent from each of modules 161 to 165, 361 to 364 in a management system having a feature according to the present invention.

In an example shown in FIG. 2, the management node 100 includes an application user 110 in the software system 400. The management node 100 receives a request sent from the outside.

Further, it can be easily supposed that the actual application user 110 is connected to a WS terminal or a console terminal to input and output messages with accessing the above-described management node.

In FIG. 2, the management node 100 uses a working area 130 per a request of the above-described application user 110, cut out from the memory 130 as a table. Further, the auxiliary memory 140 includes a definition file 141, which is set in advance, and a managed node listed file 142.

The definition file 141 stores data required for scheduling collection requests. Then, the managed node listed file 142 stores data required for grouping the managed object device and the managed nodes. The grouping is hereinafter referred to as a group control, which is later described. Further, detailed data of each file will be later explained.

In FIG. 3, the managed node 300 monitors each managed object device via the transmission path 370 with the use of the managed object module 364 in the above-described management system of the software system 410. Simultaneously, the node 300 accesses to a communication control module 350.

Consequently, the timer 320, the memory 330, and the auxiliary storage 340 can be also registered as managed object devices according to the definition in the management node 100.

In FIG. 3, the managed node 300 generates an accumulated data file 341 and an existing node file 342 in the auxiliary memory 340 according to the inquiry packet IP sent from the management node 100 via the network 200.

[A CONSIDERATION POINT ON PROTOCOL]

In the embodiment, an action execution request (m-Action) is employed as an inquiry packet.

It is also possible to employ a request for obtaining $Q_X$ interface based on the CCITT recommendation with specifying a protocol parameter. More particularly, when employing a SNMP protocol, which is an actual standard on a UNIX network instead of $Q_X$ interface, the action execution request protocol can not be supported. Therefore, it is required to use a get request (m-Get).

However, it is apparent that the mounting with the get request (m-Get) is inferior than the mounting with the action execution request (m-Action). Further, one part event report (m-Event Report) is employed as a request packet. This is an applicable protocol for both of the $Q_X$ interface and the SNMP.

The action execution request has a parameter of "operation value", which can be assigned by freely deciding contents of the operation execution requests (m-Action) between the management node 100 and the managed node 300.

The present embodiment defines the operation contents as follows:

The operation value=X: storing a list of the managed nodes 300 sent as a parameter, which has already requested to generate the managed object device.

The operation value=Y: accumulating attribute values of the managed object device required for the predetermined accumulated numbers, and replying for the values in lump.

The operation value=Z: starting accumulating the attribute values of the managed object device required for the predetermined accumulated numbers, and replying for the values.

The operation value=W: attaching the accumulated attribute values to the present action execution request and transferring the present action execution request according to the instruction of the next managed node, which is specified with a parameter. Then, if there is an instruction, re-accumulating the managed object attribute values required for the predetermined accumulated numbers.

[EXPLANATION OF A FLOWING OF A PROTOCOL]

Hereinafter, a flowing of a protocol will be explained by referring to the attached drawings with the use of the classified items. To better understand the present invention, every time a processing node is transferred along to a flowing of a protocol, * mark will be attached to a head of a line.

In the followings, each of the software systems 400, 410 of the management node 100 and the managed node 300 has the step for requesting to set a packet format, which is sent to the data edit modules 162, 362, when sending data, and requesting to send data to the communication control modules 150, 350.

On the other hand, each of the software systems 400, 410 has the step for receiving a notification sent from the communication control modules 150, 350, when receiving data and for requesting to resolve and pass the data in a notification to the data edit analyzing modules 162, 362.

(1) A PROTOCOL OF DATA DISTRIBUTION PROCESSING WHEN STARTING MANAGEMENT

Figure 4:
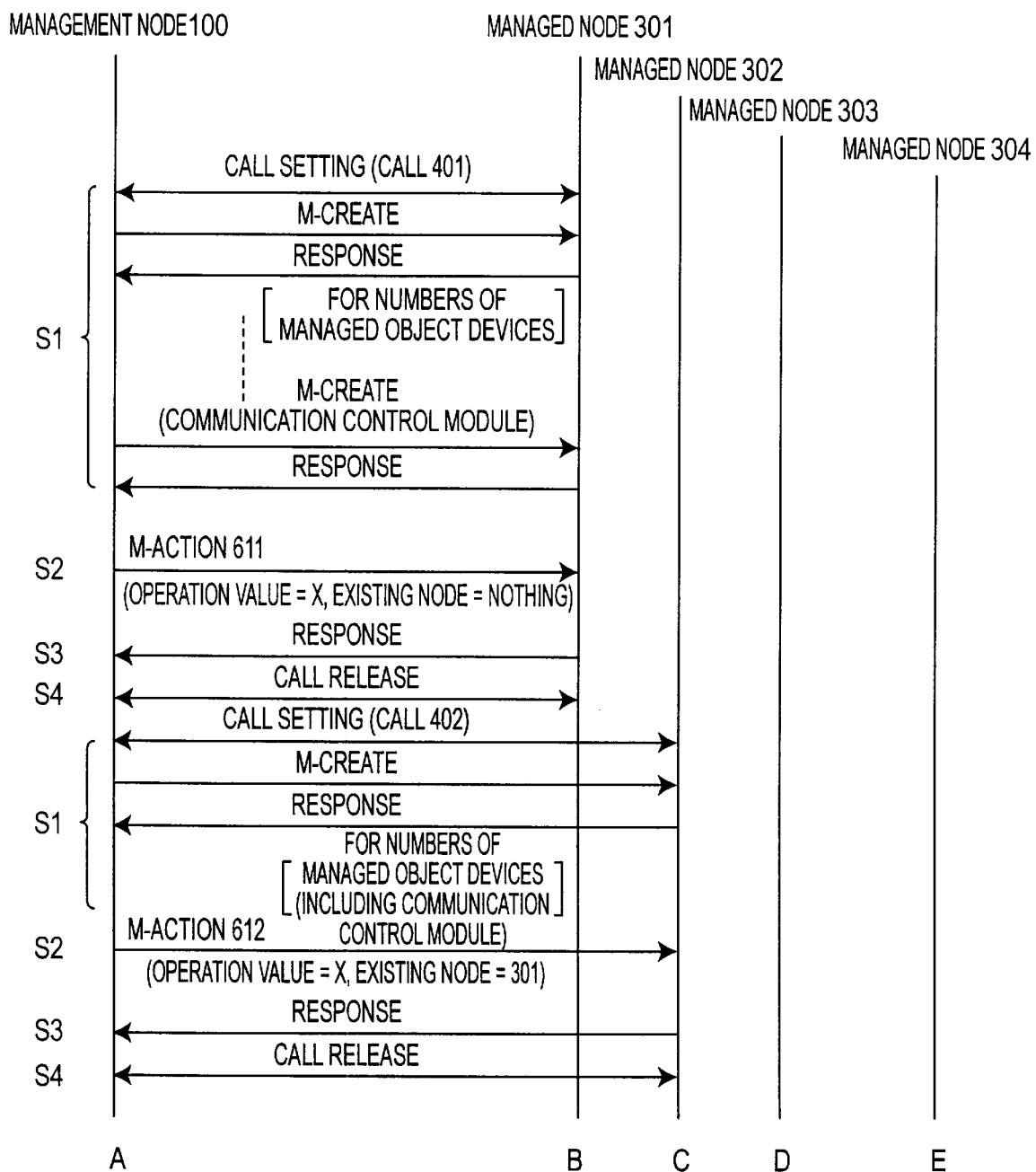
FIG. 4 is a first flow chart of sending and receiving a protocol when driving a network management system.
Figure 5:
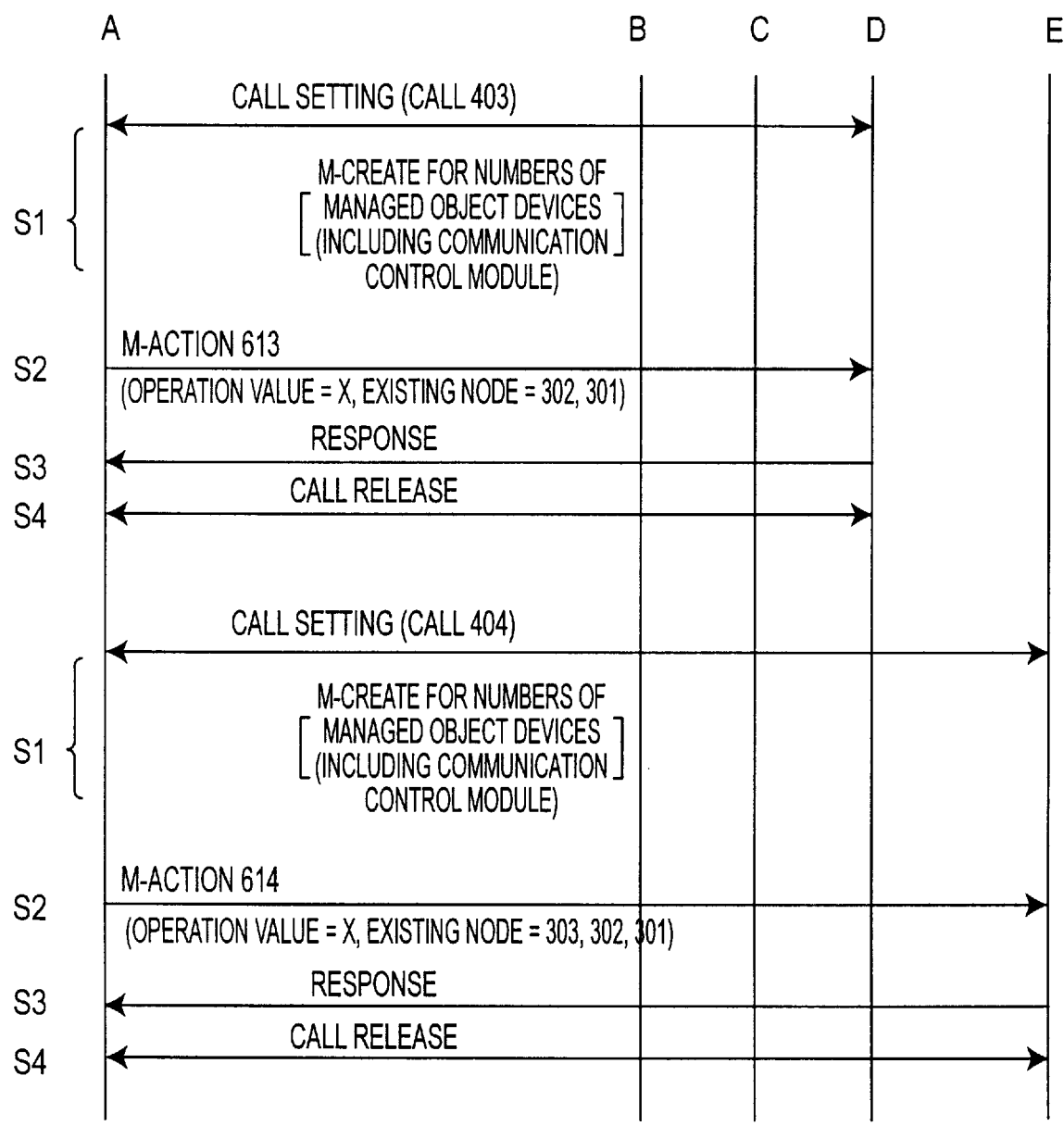
FIG. 5 is a second flow chart of sending and receiving a protocol when driving a network management system.

FIGS. 4 and 5 show flow charts of sending and receiving on a processing protocol for transferring desired data from the management node 100 to the managed node 300 to perform a data getting request when starting a network management system. Further, FIG. 4 shows an upper portion of a flowing chart, and FIG. 5 shows a bottom portion of the same flowing chart.

*: In the management node 100, when a system driving request is received from the application user 110, the request management module 161 reads the managed node listed file 142 from the auxiliary memory 140.

Calls 401 to 404 corresponding to the managed nodes 301 to 304 are subsequently set along the contents. Correspondingly, a managed object device for each of managed node 301 to 304 is notified by a managed object generating packet (m-Create in $Q_X$ interface) (STEP S1).

For example, in FIG. 4, call establishment 401 is performed between the management node 100 and the managed node 301, and simultaneously, a response sent from the managed node 301 is sent to the management node 100 to the managed object generating packet (m-Create) from the management node 100 to the managed node 301.

After notification of the above-described packet, a list of addresses of the managed nodes, which have already been sent the same packet, is notified by the inquiry packets 611 to 614 of the operation value=X. For example, a packet 613 (refer to FIG. 5) sent to the managed node 303 notifies addresses of the inquiry packet sent management nodes 301 and 302 by re-ordering the order of sending to the reversed order (STEP S2).

\*: In the managed nodes 301 to 304, the request received module 361 requests the establishment of management access means to the managed object device specified for the managed object management module 364, when receiving the managed object generating packet. The result is replied to the management node 100. When receiving the inquiry packets 611 to 614, the existing node file 342 is created in the auxiliary storage 340, and the result is notified to the management node 100 by the response packet (STEP S3).

\*: The management node 100 extracts the result of working in the managed node from the response packet, reflects the result to the managed node listed file 142, and temporarily releases and disconnects the calls 401 to 404 (STEP S4).

(2) A PROTOCOL OF DATA DISTRIBUTION PROCESSING WHEN ADDING THE MANAGED OBJECT DEVICE

Figure 6:
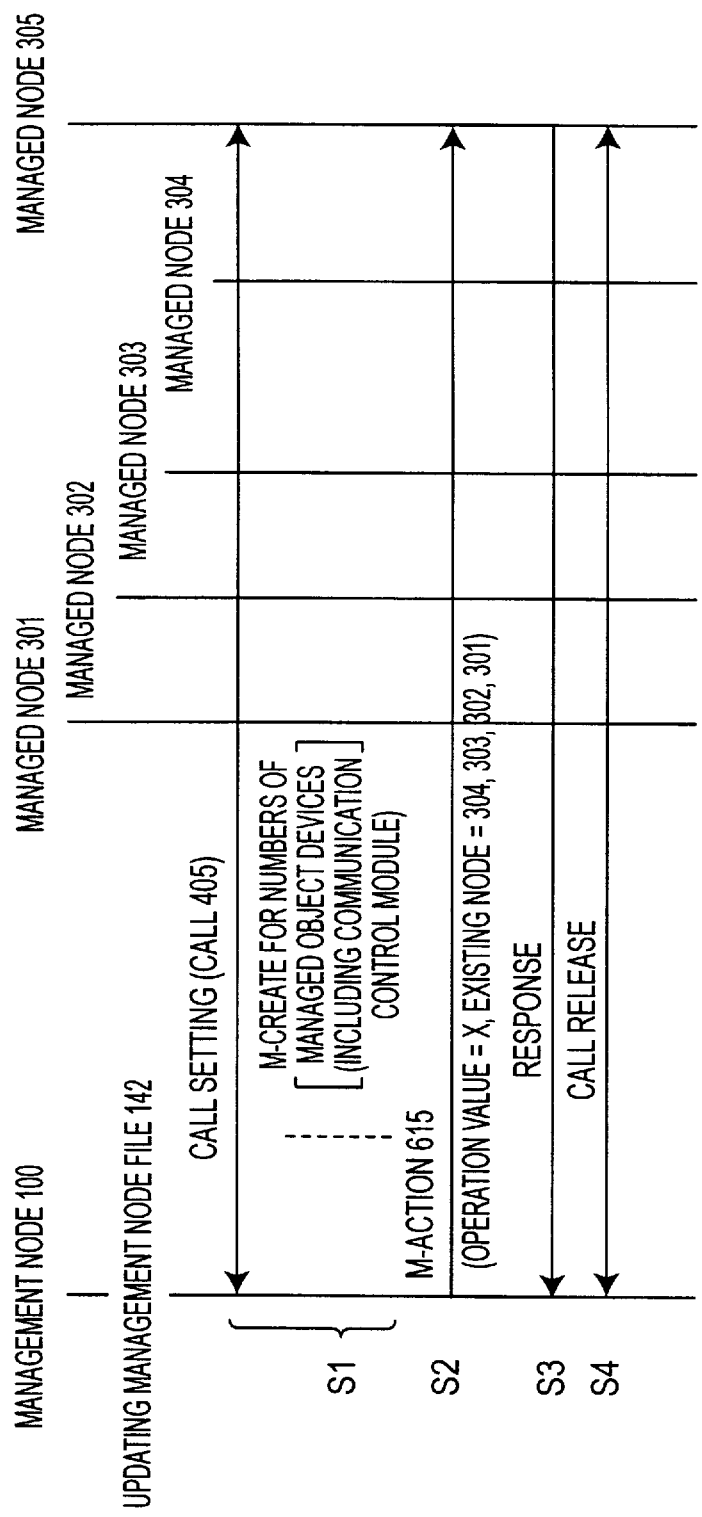
FIG. 6 shows a flow chart of sending and receiving a protocol when adding a managed node in the flow charts of FIGS. 4 and 5.

FIG. 6 shows a flowchart of sending and receiving the packets between the management node 100 and the managed node 305, when additionally adding the managed node 305 after forming the call establishments 401 to 404 with a structure shown in FIG. 1 according to the flow shown in FIGS. 4 and 5.

\*: When the management node 100 receives the addition of the managed node 305 from the application user 110, a request management module 161 adds requested data of the managed node 305 in the managed node listed file 142. Then, a call 405 is established between the management node 100 and the managed node 305 to notify the managed object device with the managed object generating packet as the same as the processing of (1) A PROTOCOL OF DATA DISTRIBUTION PROCESSING WHEN STARTING THE MANAGEMENT (STEP S1).

After then, the inquiry packet of the operation value=X notifies the addresses of the existing managed nodes 301 to 304 with listing in a descending order from the existing managed node 304 (STEP S2).

\*: The managed node 305 generates the existing node file 342 to establish a management access method and notify each result of processing with a response packet (STEP S3).

\*: The management node 100 extracts the result of the operation in the managed node 305 from the response packet, and releases and disconnects a call 405 by reflecting to the managed node listed file 142 (STEP S4).

(3) A PROTOCOL WHEN REQUESTING A MANAGED NODE TO COLLECT

Figure 7:
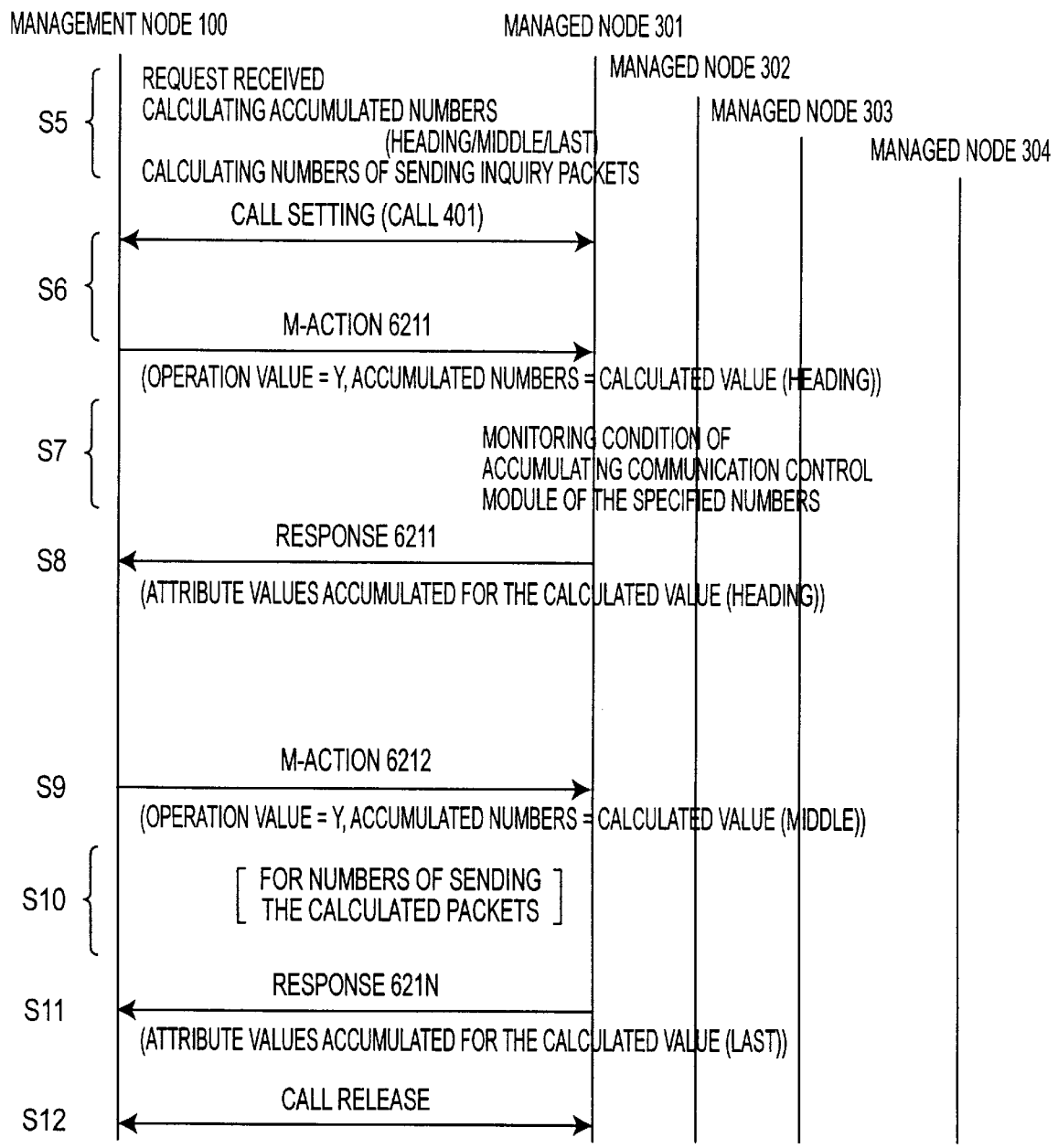
FIG. 7 shows a flow chart of sending and receiving data between a management node and a managed node when collecting data of a device, which manages one management node.

FIG. 7 shows a processing flow chart of sending and receiving data between the management node 100 and the managed node 301 to collect data of a device, which is managed in the managed node 301 by the application user 110, after a network is structured as shown in FIG. 1 on a processing flow of a protocol shown in the above-described (1) A PROTOCOL OF DATA DISTRIBUTION PROCESSING WHEN STARTING MANAGEMENT.

\*: When the request management module 161 receives a request of collecting data from the application user 110 in the management node 100, the request management module 161 confirms a schedule of collection requests, which have been already processing.

After a part of a data of the managed node listed data file 142 is opened to an area 131 cut out from the memory 130, a calculation of opportunity to be an access of the managed node 301 is requested to a scheduling module 163 (STEP S5).

The scheduling module 163 reads a defined file 141, and calculates data in the defined file 141 and the following values by employing a collection time, collection interval, and response allowable time given from the application user 110 as a parameter.

a) Inquiry number: Numbers for sending inquiry packet to the managed node b) Last accumulated numbers: Numbers for collecting data passed from the managed node in all, which is the last response of the inquiry.

c) Intermediate accumulated numbers: Numbers for collecting data passed from the managed node in all, which is not the last response of the inquiry.

Further, these calculations will be explained later.

After calculating the above-described values, output values are written to a table opened to the memory area 131 to return controls to a request management module 161.

The request management module 161 opens the replied data of the above-described c) and a collection interval passed from the application user 110 to an inquiry packet 6211 of the operation value=Y, and sends the result to the managed node 301, which manages the device (STEP S6).

\*: In the managed node 301, which receives the inquiry packet 6211, the request received module 361 creates the accumulation data file 341 to an auxiliary storage 340, and requests the collection of the attribute values of the corresponding managed object device to the managed object management module 364 (STEP S7).

When receiving the data from the managed object module 364, the request received module 361 writes the current time and the received data to the above-created accumulation data file 341. Additionally, the module 361 requests a clock management module 363 to notify the data periodically with a collection interval written in the above-described inquiry packet 6211.

According to this request, the clock management module 363 notifies periodically by employing a timer 320, and the request received module 361 requests the managed object management module 364 to collect the attribute values of the corresponding managed object devices again.

When the clock management module 363 receives collection data from the managed object management module 364, the module 363 compares the attributes values with the previous collected attributes. If the value is different from the previous value, the module 363 writes the value with the current time and the received data to the accumulated data file 341.

The above-described processing is repeated, and finally, the request to the managed object management module 364 for the above-described accumulated numbers [the value of the above-described c)]. Then, the request received module 361 requests data collection under a load condition of the communication control module 350 to the managed object management module 364.

The value under the load condition reflects a collision frequency, when employing LAN, and a reply time of a flow control packet, when employing WAN are reflected. If the value under a load condition is higher than a predetermined reference value, which is the value statically hold in a program, it is postponed to send the response packet and it is performed to wait a time out in data collection from the clock management module 363 again (STEP S7).

If it is judged that there is no load condition, all of the accumulated data file 3410 and the current time are opened to the response packet 6211, and sent to the management node 100. Then, the clock management module 363 is requested so as to finish the periodical notification, which is requested according to the above-described step (STEP S8).

*: The request management module 161 refers to the memory 131 in the management node 100, which receives the response packet 6211, returns the inquiry packet 6212, which sets the value of the middle accumulated numbers [see the above-described c)], back to the managed node 301 (STEP S9).

Then, the request management module 161 judges the data amount, which is sent in lump-sum by referring the first time of the attribute value in the response packet 6211 and the last added time. If there are more data than the above-described heading accumulated numbers, which is specified in the inquiry packet 6211, the module 161 subtracts the times from the above-described middle accumulated numbers, sets and sends the subtracted numbers to the above-described inquiry packet 6212.

After sending the numbers, the module 161 refers the data of the attribute value in the response packet 6211 again, and restores data of the time abbreviated in the managed node 301. That means, the module 161 makes the time to the same value by retrieving the closest time selected from the previous times.

After restoring the data, the data is stored in the auxiliary storage 140 as a log, according to an instruction of the storing place on the time of requesting to collect from the application user, or the data is replied to the application user 110. Further, the more data inserting according to the network load around the managed node are also stored and replied, similarly.

*: The processing of the managed node 301, which receives the inquiry packet 6212 (STEP S10), is the same as the processing (STEP S7) on the time of receiving the above-described inquiry packet 6211 except changing the collection numbers.

The above-described processing are repeated for the values of the above-described inquiry numbers [the above-described a)].

Additionally, in the last inquiry packet 621n, the management node 100 sets a value of a last accumulated number [the above-described b)] to the appropriate packet. Then, if the above-described last accumulated number [the above-described b)] is 0, the inquiry packet 621n is not sent and the processing goes to the next releasing processing. In the case of FIG. 7, there is a response packet 621n corresponding to the inquiry packet 621n exists (STEP S11).

After finishing to repeat the above-described processing, the request management module 161 releases the call 401 and finishes the processing in the management node 100 (STEP S12).

(4) A PROTOCOL WHEN REQUESTING A PLURALITY OF MANAGED NODES TO COLLECT WHEN RECEIVING REQUESTS

Figure 8:
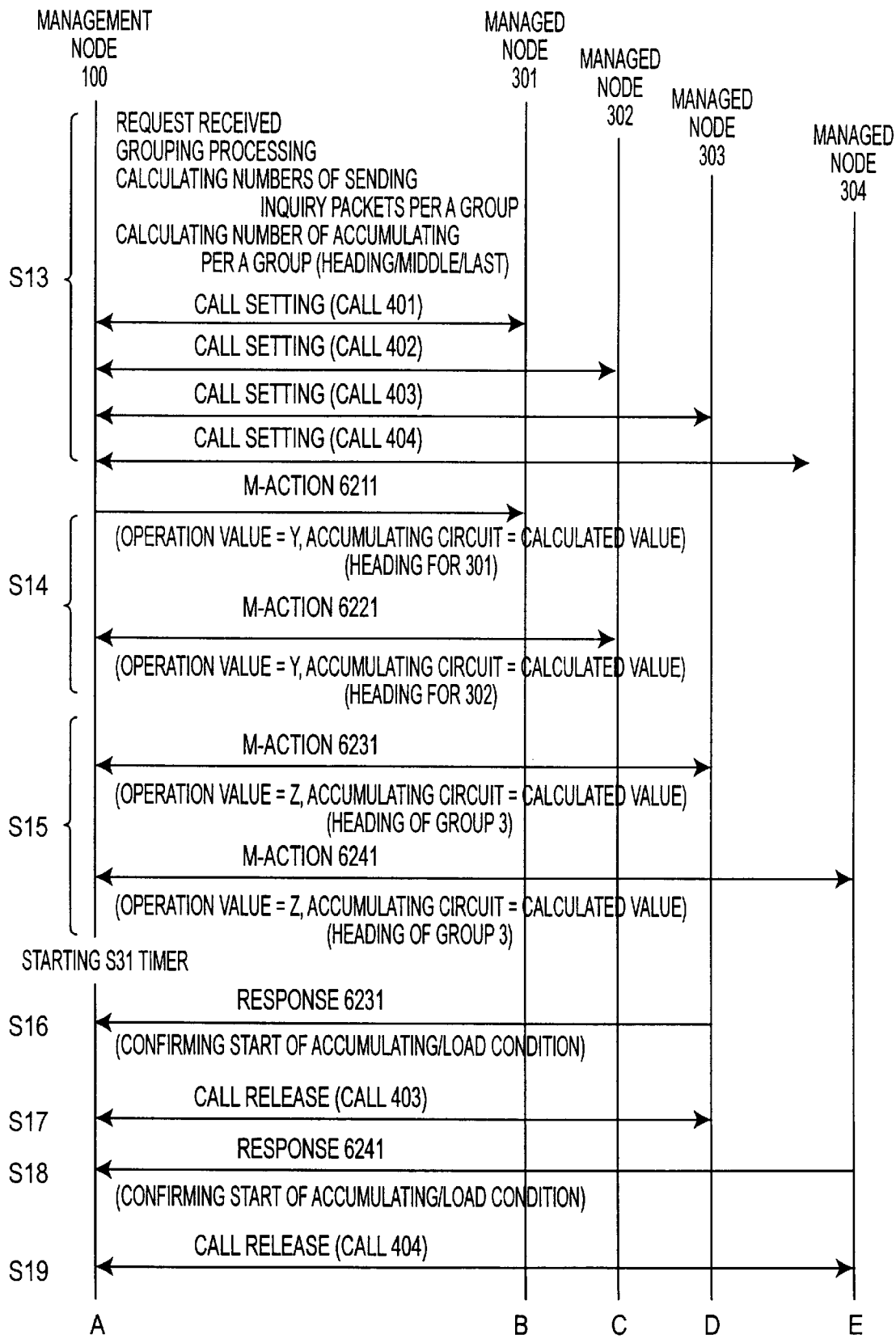
FIG. 8 shows a first flow chart of sending and receiving data between a management node and a managed node when collecting data of a device, which manages a plurality of management nodes.
Figure 9:
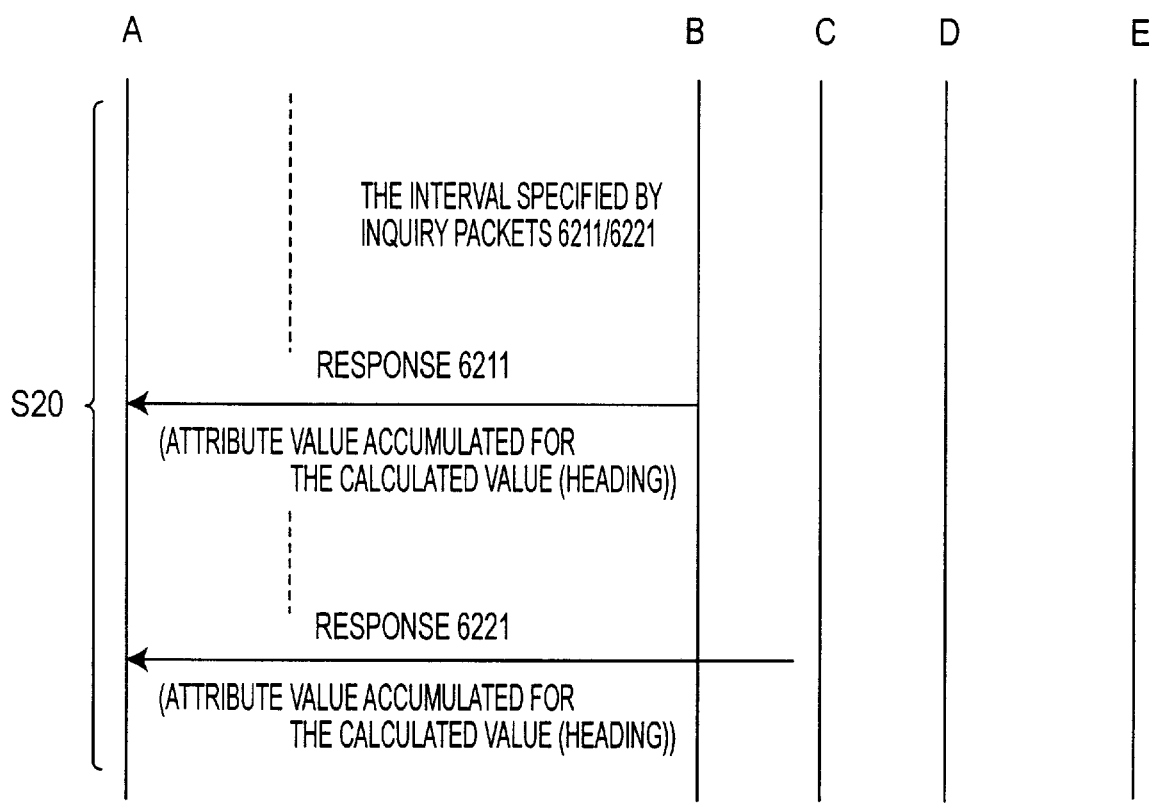
FIG. 9 shows a second flow chart of sending and receiving data between a management node and a managed node when collecting data of a device, which manages a plurality of management nodes.

FIGS. 8 and 9 show modes of sending and receiving data between the management node 100 and each managed node, when the application user 110 requests to collect the data of the managed object devices managed in the managed node 301 to 304 by the application user 110, after a network structure shown in FIG. 1 is formed according to a flow described in (1) A PROTOCOL OF DATA DISTRIBUTION PROCESSING WHEN STARTING MANAGEMENT. The operation flow chart is divided into FIGS. 8 and 9.

*: When the request management module 161 receives a request of data collection from the application user 110 in the management node 100, the management node 100 confirms a schedule for the collection request, which is already processing, opens to a memory area 131, which is a part of data of the managed node listed data file 142, and requests the scheduling module 163 to perform a calculation of access timings (STEP S13).

The scheduling module 163 calculates the following values based on a data in a definition file 141, a collection time, a collection interval, and a response allowable time, which are given from the application user 110.

d) Number of the managed node, which can collect data with time shifting.

In FIGS. 8 and 9, the number of d) is 3. As the number is smaller than 4, which is the number of the managed node specified from the application user 110, it is judged to require group management control to call the group control module 164.

The group control module 164 searches a coordinates piled up from the managed node specified from the application user 110 by referring a copy file of the managed node listed data 142, which is opened to a memory area 131, and hereinafter, piling the plurality of nodes is so-called as "grouping".

The above-described managed node listed data 142 flags to an individual section, in which each managed node is entered, to add the number of groups for the searched coordinate of the managed node, and hereinafter referred to as a "group".

Further, an addition processing of the above-described flag control and the group number will be explained later.

In FIGS. 8 and 9, each of the managed nodes 301, 302 is single, and each of the managed nodes 303, 304 is grouped with a group number 3.

When returning a control from the group control module 164, a scheduling module 163 calculates the following values per a group of the allocated managed modules by employing a data of the above-described definition file 141, the above-described collection time, collection interval, response allowable time, again, similarly with the above-described processing of (3) A PROTOCOL WHEN REQUESTING ONE UNMANAGED NODE TO COLLECT (STEP S13).

e) Inquiry numbers: numbers for sending an inquiry packet to a managed node f) Heading accumulated numbers: numbers for collecting data, which is passed to the managed node for one time in a beginning inquiry response.

g) Last accumulated numbers: numbers for collecting data, which is passed to the managed node for one time in a last inquiry response.

h) Intermediate accumulated numbers: numbers for collecting data, which is passed to the managed node for one time in an inquiry response other than f) and g)

i) Initial collection interval: when it is required to space an interval, which is smaller than a collection interval specified by the user as shifting a period, time lag for notification per a specified group is generated by shifting the values of f), g) and i) per a group.

Each of the calculated data is written to a table opened to a memory area 131 to return a control back to the requested management module 161, similarly with the above-described processing of (3) A PROTOCOL WHEN REQUESTING A MANAGED NODE TO COLLECT.

Calculations of the values d) to i) and a processing of the request schedule table will be described later.

The request management module 161 confirms the existence of the grouped managed node with the above-described flag, opens the above-described heading accumulated number [the above-described f)], the first collection interval [the above-described i)], and the above-described collection interval passed from the application user to the single managed nodes 301, 302, and sends the inquiry packets 6211, 6221 of the operation value=Y (STEP S14).

The module 161 opens the heading accumulated number [the above-described f)], the first collection interval [the above-described i)], and the collection interval, which is the same as the above-described collection interval, specified by the application user, and sends the inquiry packets 6231, 6241 of the operation value=Z (STEP S15).

The request management module 161 requests the clock management module 165 to notify with the minimum interval selected from the above-described first collection interval [the above-described i)] opened to each of inquiry packets, after finishing to send all packets, in the case of sending the inquiry packet of the operation value=Z. At the same time, a timer is started (STEP S31).

\*: In each of the managed nodes 301 to 304, which receives each of inquiry packets 6211 to 6241, each of the request received modules 361 subsequently requests to each of the corresponding managed object management modules 364 so as to collect the attribute value with a collection interval specified by each packet.

The processing flow is approximately the same as the above-described (3) A PROTOCOL WHEN REQUESTING A MANAGED NODE TO COLLECT. Only if the above-described first collection interval [the above-described i)] is other than 0, a processing for changing the beginning collection interval according to the appropriate specified value.

In the managed nodes 303, 304, which receive the inquiry packets 6231, 6241 of the operation value=Z, each of the request received modules 361 finishes to request the data collection to the first managed object management module 364. Then, the modules 361 requests to refer load condition on the current point of each of the communication control modules 350 to the managed object management module 364 again by adding the start processing of the above-described data collection.

Then, the response packets 6231, 6241 are sent to the management node 100 by attaching the following data as "processing condition" (STEPS S16 and S18).

The data shows:

whether or not reference to the managed object device can be performed with no problem: and whether or not communication control module is under loading.

\*: In the management node 100, which received the response packets 6231, 6241, the management module 161 notifies the processing condition in the appropriate packet to the group control module 164.

The group control module 164 sets the above-described processing condition to an individual section, in which the managed object node is entered, of a table, to which the node listed data 142 opened to a memory area 131.

When the control is returned, the request management module 161 releases calls on the time of receiving the response packets 6231, 6241 to the managed node, which performs an inquiry of the operation value=Z (STEPs S17 and S19).

Further, in FIG. 9, the managed nodes 301, 302 sends the response packets 6211, 6221, similarly with the above-described processing of (3) A PROTOCOL WHEN REQUESTING A MANAGED NODE TO COLLECT: (STEP S20).

As described above, the processing caused by the requests from the application user are finished. Then, the following step (5) will be performed, every time the clock management modules 165, 363 of the management node and the managed node perform notifications.

(5) A PROTOCOL WHEN REQUESTING A PLURALITY OF MANAGED NODES TO COLLECT WHEN STARTING DUE TO A NOTIFICATION FROM A TIMER

Figure 10:
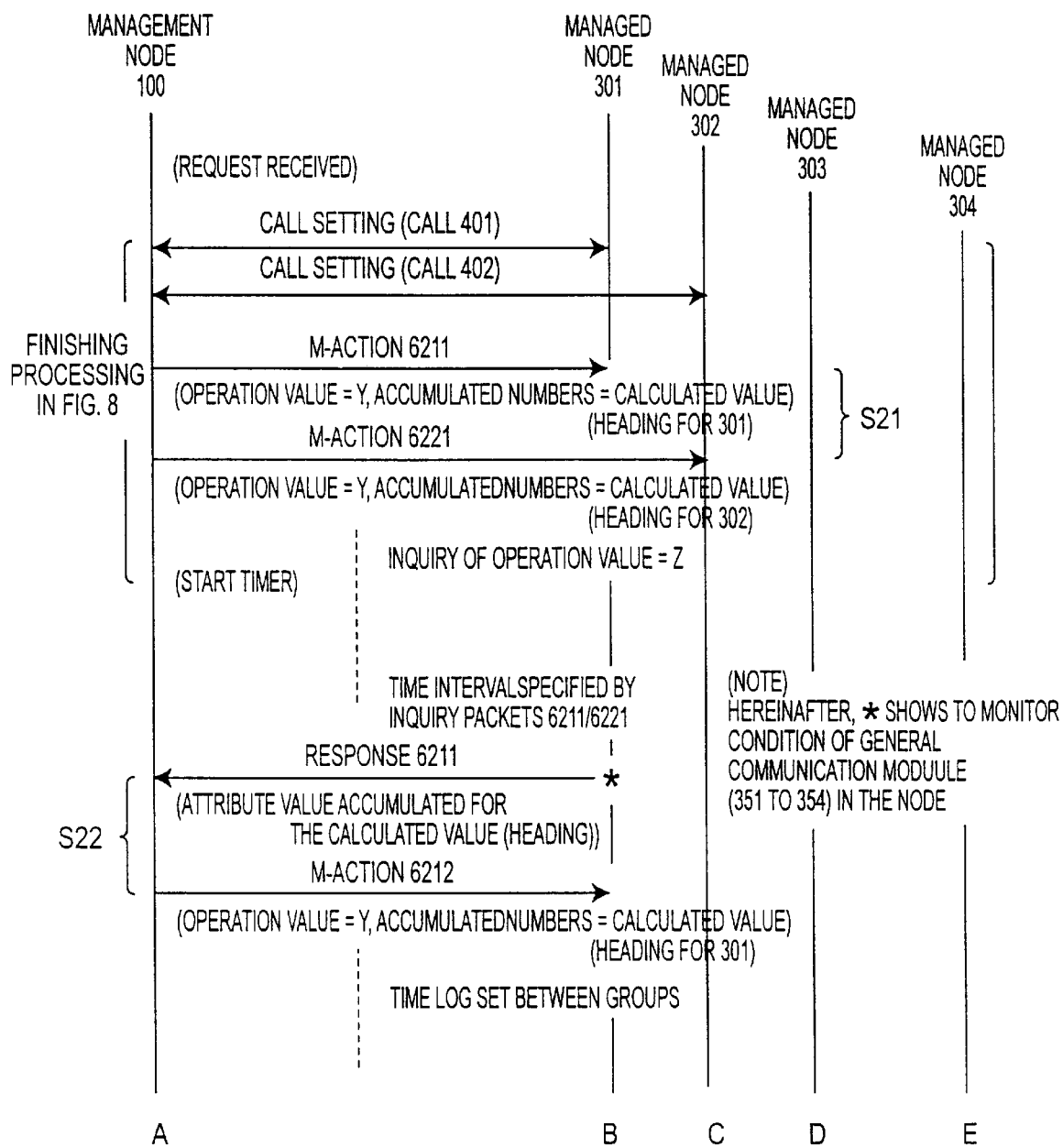
FIG. 10 shows a first processing flow chart for driving when a clock management module generates a notification.
Figure 11:
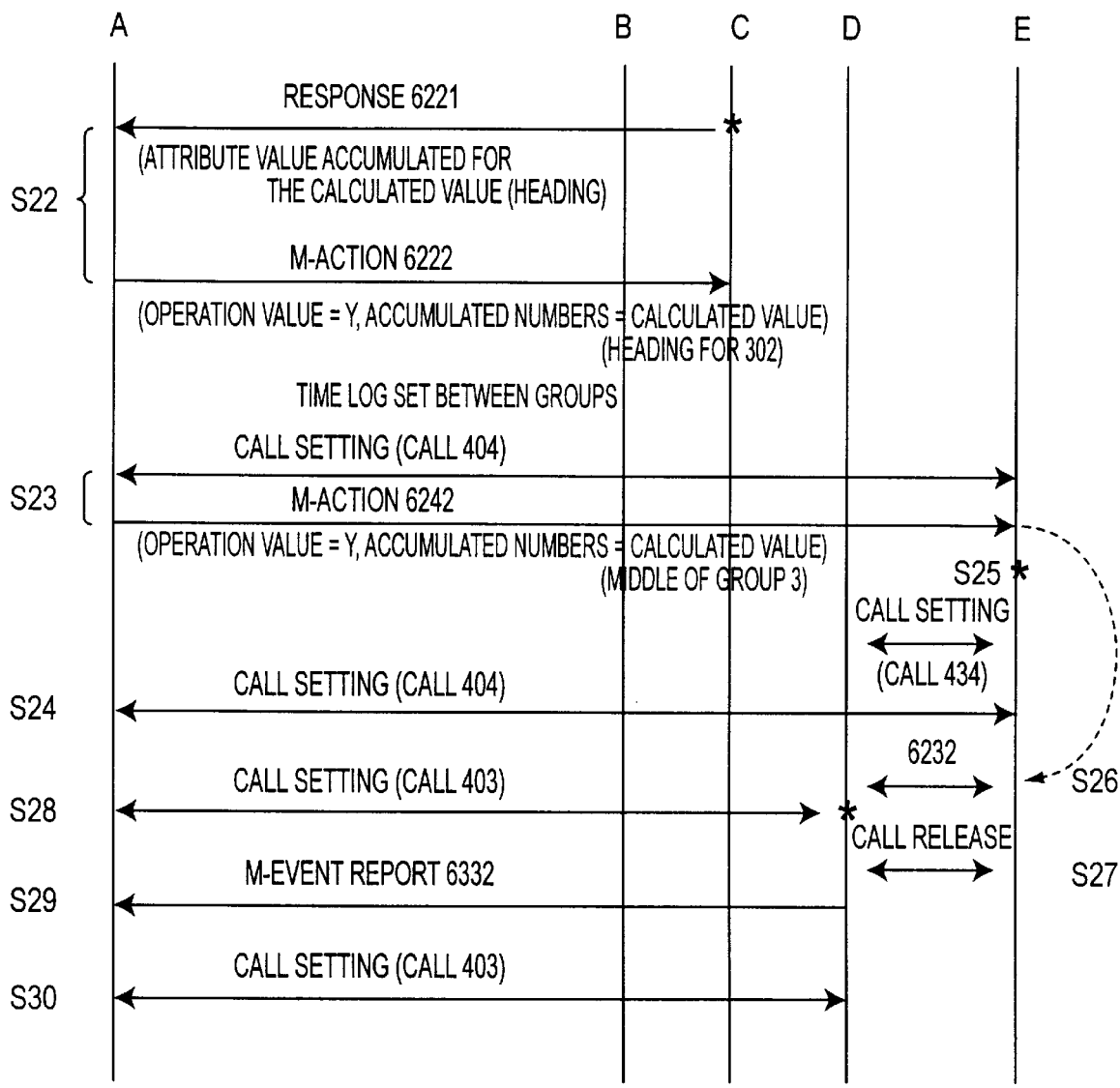
FIG. 11 shows a second processing flow chart for driving when a clock management module generates a notification.

FIGS. 10 and 11 show a processing flow chart, of which operation is started when the clock management modules 165, 363 in the management node and the managed node, after notifying that data collection is started from the management node 100 to the managed nodes 301 to 304 according to a processing flow of the above-described processing of (4) A PROTOCOL WHEN REQUESTING A PLURALITY OF MANAGED NODES TO COLLECT WHEN RECEIVING REQUESTS: on a network structured as shown in FIG. 1.

\*: In the managed nodes 301 to 304, as shown in the above-described processing of (3) A PROTOCOL WHEN REQUESTING A MANAGED NODE TO COLLECT:, each of the request received modules 361 collects and accumulates attribute values of the managed object device and the current time via a request to the corresponding managed object management module 364, when notifying from each clock management module 363.

Further, on the above-described processing of (4) A PROTOCOL WHEN REQUESTING A PLURALITY OF MANAGED NODES TO COLLECT WHEN RECEIVING REQUESTS:, the managed nodes 301, 302, which received an inquiry packet of the operation value=Y, i.e., the managed node, which returns a response independently without grouping, the request received module 361 monitors a load condition of the accumulated numbers and the general communication control module 350, and sends the response packets 6211, 6221, similarly with the above-described processing of (3) A PROTOCOL WHEN REQUESTING A MANAGED NODE TO COLLECT: (STEP S22).

\*: The management node 100, which received the response packets 6211, 6221, that is, a response for an inquiry of the operation value=Y, as shown in the above-described processing of (3) A PROTOCOL WHEN REQUESTING A MANAGED NODE TO COLLECT:, checks the additional attribute values, and sends the following inquiry packets 6212, 6222 to each of the managed nodes, which send responses (STEP S22).

The above-described processing is the same as the above-described processing of (3) A PROTOCOL WHEN REQUESTING A MANAGED NODE TO COLLECT:, except the step of skipping the processing of the managed node, which received an inquiry packet of the operation value=Z, for sending the response packets.

\*: The management node 100 monitors the accumulated numbers of the individual section of the managed node, that is, grouped managed node, which sends an inquiry packet of the operation value=Z of the managed node listed data table 142, to which the memory area 131 the request management module 161 is opened, according to the periodical notification from the clock management module 165.

When the request management module 161 judges the managed node side has accumulated the individual section for the predetermined required numbers, the module 161 picks up the managed nodes having the corresponding group number from the above-described managed node listed data table, of which processing condition of the communication control module 150 is normal, and edits the address data by making the managed nodes to bit maps. Simultaneously, the module 161 specifies the managed node 304, which requests for lately generating the managed object device selected from the picked-up managed nodes (see the above-described processing (1) to (2)).

After establishing the call 404 for the managed node 304 specified on the above-described processing, the bits corresponding to the managed node 304 are cleared from the address data of the edited bit map on the above-described processing. Then, the bits are added to the intermediate accumulated numbers of the group corresponding to the address data, which is re-edited to the inquiry packet 6242 of the operation value=W [see the value of h), which is calculated on the above-described processing of (4)], and are sent to the managed node 304 by employing the set call 404 (STEP S23).

Further, the contents of bit mapped processing of the address data will be explained later.

After sending the inquiry packet 6242, the request management module 161 releases without waiting the responses (STEP S24).

An inquiry packet 62X2 of the operation value=W, of which address data is cleared, is sent to the managed node having the same corresponding group number, of which load condition of the communication control module is abnormal, except the above-described processing.

*: In the managed node 304, which received the inquiry packet 6242, the request received module 361 requests the managed object management module 364 to refer the load condition of the general communication control module 350 on the current point, and judges the load condition of the appropriate communication control module 350 according to the referred result.

If the load condition is normal, the request module 361 refers the bit map of the address data in the received inquiry packet 6242, compares the bit map with the existing node file 342, and picks up the managed node, to which an inquiry packet is not sent yet. By selecting the managed node, which is entered at first from the picked managed nodes, the module 361 specifies the next accessing managed node 303 in order to set the call 434 (STEP S25).

After then, the module 361 of the managed node 304 clears the bits corresponding to the managed node 303 with the use of the address data of the inquiry packet 6242, and adds the data in the accumulated data file 341 to the data of the inquiry packet 6242. Thereby, the module 361 can generate the inquiry packet 6232 of the operation value=W (STEP S26).

The module 361 of The managed node 304 sends the generated packets to the managed node 303, and releases the call 434 without waiting the response as the same as the management node 100 (STEP S27). Further, the contents of bit map reading processing will be described later.

When the load condition is abnormal, the managed node 304 waits until coming to next opportunity of collecting the attribute values as the same as the processing of the managed node 301 of the above-described processing of (3) A PROTOCOL WHEN REQUESTING A MANAGED NODE TO COLLECT:, and refers the load condition of the communication control module 350 again. When the node 303 confirms the load condition is normal, the node 303 sends the above-described inquiry packet 6232.

*: In the managed node 303, which receives the inquiry packet 6232, the request received module 361 judges the load condition of the communication control module 353, and specifies the next accessing managed node, as the same as the above-described processing of the managed node 304.

In this case, as the address data bit map in the inquiry packet 6232 has been already cleared, the request received module 361 of the managed node 303 judges that there is no managed node, which sends the inquiry packet next, and sets the call 403 to the management node 100 (STEP S28).

After setting the call 403, the request received module 361 of the managed node 303 extracts the accumulating data of the managed node attached to the inquiry packet 6232, adds the data of the accumulating data file 341 in the auxiliary memory 340, and adds all data to the m-Event Report Protocol. Thereby, the module 361 of the managed node 303 sends the response packet 6232 to the management node 100 (STEP S29).

*: In the management node 100, which received the response packet 6332, the request management module 161 stores the packet 6232 to the auxiliary memory 140 as a log or returns the packet to the application user, according to an instruction of the stored place of the collection request from the application user, after restoring the data of the abbreviated time, as the same as the above-described processing of (3) A PROTOCOL WHEN REQUESTING A MANAGED NODE TO COLLECT.

Further, the request management module 161 searches a beginning and an end time of collecting in each of the managed nodes 303, 304, and returns the numbers to the group control module 164.

The group control module 164 judges whether or not the load of the communication control module is generated, according to whether or not each of the managed nodes obtains more data of the attribute values.

When the load is generated, the module 164 specifies the first managed node, which obtains more data of the attribute values, i.e., the first managed node in the order of receiving the inquiry packet of the operation value=W, and makes the processing condition of the individual section, in which the specified managed node is entered, of the managed node listed table 142, which is opened to the memory area 131 as "load generation".

On the other hand, there is a case where a load has already been generated, and the managed node 30X, which is individually sent the inquiry packet 62X6 on the above-described processing, passes the attribute values neither too much nor too less for the numbers required in the inquiry packet 62X2.

In this case, the processing condition of the individual section corresponding to the appropriate managed node 30X in the managed node listed table, which is opened to the memory area 131, becomes "normal", as the load of the appropriate managed node 30X is released.

The above-described daisy chain processing is repeated for the numbers required for the inquiry numbers, that is, the value e), which is calculated on the above-described processing of (4) A PROTOCOL WHEN REQUESTING A

PLURALITY OF MANAGED NODES TO COLLECT WHEN RECEIVING REQUESTS.

Then, the end accumulated numbers, the value of g), which is calculated on the above-described processing of (4) A PROTOCOL WHEN REQUESTING A PLURALITY OF MANAGED NODES TO COLLECT WHEN RECEIVING REQUESTS corresponding to the appropriate group number as the accumulated number is set to the second inquiry packet of the operation value=W from the last packet, and 0 is set to the last inquiry packet 624n of the operation value=W as the accumulated number.

When the last accumulated number, i.e., the value of g), it is omitted to send the last packet.

Each of the managed nodes, which received an inquiry packet of the operation value=W, of which accumulated number is 0, requests to stop scheduling of the notification to the clock management module, and deletes the accumulated data file 341.

The management node 100, which received a response packet (m-Event Report 633n) for the inquiry packet 624n of the operation value=W, of which accumulated number is 0, releases the memory area 131, stores and notifies data, and finishes the processing for requests at last (STEP S30).

(6) CALCULATION AND SCHEDULING METHOD OF ACCUMNUMTED NUMBERS

On the above-described processing of (3) A PROTOCOL WHEN REQUESTING A MANAGED NODE TO COLLECT: or (4) A PROTOCOL WHEN REQUESTING A PLURALITY OF MANAGED NODES TO COLLECT (WHEN RECEIVING REQUESTS):, the management node 100 calculates the numbers for accumulating the attribute values in the managed nodes 301 to 304 based on a data given from the application user 110 and the definition file 141.

The contents of the processing will be explained as follows.

The definition data file 141 stores the following information with the form of a power of 2. Hereinafter, the nth power of 2 is described as $2\uparrow n$.

aa) Desired notification interval: a time interval, which is set while the management node receives two notifications= $2\uparrow\alpha$ seconds ($\alpha<0$).

bb) Delay allowable value: what times of the specified response time the management node waits a notification= $2\uparrow\beta$ ($\beta>0$).

cc) Request Received number: number of requests for scheduling concurrently=$2\uparrow\gamma$ ($\gamma>0$).

The request management module 161 statically holds Δ, which means "the number of the requests, which are currently managed".

When the management node 100 receives the contents of the requests, 1 of the above-described Δ, i.e., the number of requests, which are currently managed. Then, the node 100 confirms the added value is less than the above-described $2\uparrow\gamma$. Thereby, the node 100 checks "the collection request, which has already been processing" on the above-described processing of (3) A PROTOCOL WHEN REQUESTING A MANAGED NODE TO COLLECT AND (4) A PROTOCOL WHEN REQUESTING A PLURALITY OF MANAGED NODES TO COLLECT WHEN RECEIVING REQUESTS.

If all of the processing for the collection requests are finished by repeating the inquiry processing, the request management module 161 subtracts 1 from the above-described [ ], which is the number of requests currently managed.

The specification of the collection requests from the application user 110 includes the following parameters:

dd) Collection interval: showing an interval for collecting the attribute value with a form of an involved power of $2=2\uparrow A$ seconds (Between 1 and 1024=less than 15 minutes).

ee) Collection numbers: Entire numbers for collecting the data of the attribute values=N.

ff) Allowable response time: Regular response waiting time=T.

At first, the management node 100 calculates and selects maximum value $2\uparrow t$ from numbers of the powers of 2, which is less than the value of an allowable response time T, which is specified by the application user 110. Then, the node 100 confirms the time interval, which is notified with accumulating data, is $2\uparrow[t-\beta]$, and that $2\uparrow[t-\beta]$ is more than $2\uparrow A$, that is, collection interval.

A notification can be received per $2\uparrow[\alpha+\gamma]$ seconds with one request. Therefore, "the number of the managed nodes, which are capable of collecting data with shifting time" is obtained by the expression of $2\uparrow[(t-\beta)-(\alpha+\gamma)]$. The obtained number is employed as the value of the above-described d) on the above-described processing of (4) A PROTOCOL WHEN REQUESTING A PLURALITY OF MANAGED NODES TO COLLECT (WHEN RECEIVING REQUESTS). Further, the request management module 161 judges whether or not group control is required by comparing the obtained value with the number of the managed nodes, which are specified by the application user 110.

After calculating the intermediate accumulated numbers of the above-described c) on the above-described processing of (3) A PROTOCOL WHEN REQUESTING A MANAGED NODE TO COLLECT and the above-described h) on the above-described processing of (4) A PROTOCOL WHEN REQUESTING A PLURALITY OF MANAGED NODES TO COLLECT WHEN RECEIVING REQUESTS: with the expression $2\uparrow[t-\beta]/2\uparrow A=2\uparrow[T-\beta-A]$, time lag from a primitive period $2\uparrow[t-\beta]$ on each group will be obtained as follows. Hereinafter, the managed node, which individually receives the inquiry packet of the operation value=Y, is also employed as an individual group) will be obtained as follows:

"If (i−1) is expressed with binary numbers, and a figure showing $2\uparrow p$ ($p\geq 0$) is 1, $2[-p-1]\times 2\uparrow[t-\beta]$ is added to a time lag of the ith group."

For example, if (11−1=10) is expressed with binary numbers, it becomes "1010". Then, the figures of $2\uparrow 1$ and $2\uparrow 3$ are 1, the time lag of the 11th group is shown with the expression of $2\uparrow[-1]\times 2\uparrow[t-\beta]+2\uparrow[-4]\times 2\uparrow[t-\beta]=(1/4+1/16)\times 2\uparrow[t-\beta]=5/16\times 2\uparrow[t-\beta]$.

The value of the time lag is further resolved as follows:

When the value is $2\uparrow A\times j+2\uparrow[\alpha+\gamma]k$, wherein j and k are non negative integer, and $2\uparrow[\alpha+\gamma]\times k\leq 2\uparrow A$:

i) $2\uparrow[\alpha+\gamma]\times k$ is a first collection interval, i.e., the value of h) on the above-described processing of (4).

ii) j is a heading accumulated numbers, i.e., the value of f) on the above-described processing of (4).

iii) $(N-j)/2\uparrow[T-\beta-A]+2$ (Adding 2 to the divided quotient) is the number of the inquiries, i.e., the value of a) on the above-described processing of (3) and the value of e) on the above-described processing of (4).

iv) $(N-j) \% 2\uparrow[T-\beta-A]$, which is the divided remainder, is a last accumulated numbers, i.e., the value of b) on the processing of (3) and the value of g) on the processing of (4).

The request management module 161 subtracts the number of the inquiries of the values a) and e) on the above-described processing of (3) and (4), every time the module 161 sends the inquiry packets of the operation value=Y or W to manage repetition of the inquiry packets.

On the processing, the inquiry number of the values a) and e) on the above-described processing of (3) and (4) are obtained by calculating the inquiry packets for collection of the heading accumulated number and the collection of the last accumulated number without a condition. Therefore, if the heading accumulated number of the value f) on the processing of (4) or the last accumulated number of the value g) on the processing of (4) is 0, and the processing of sending the corresponding inquiry packets is skipped, 1 is subtracted from the above-described inquiry number.

(7) MANAGED NODE LISTED FILE/MANAGED NODE LISTED DATA AND BIT MAP

Figure 12:
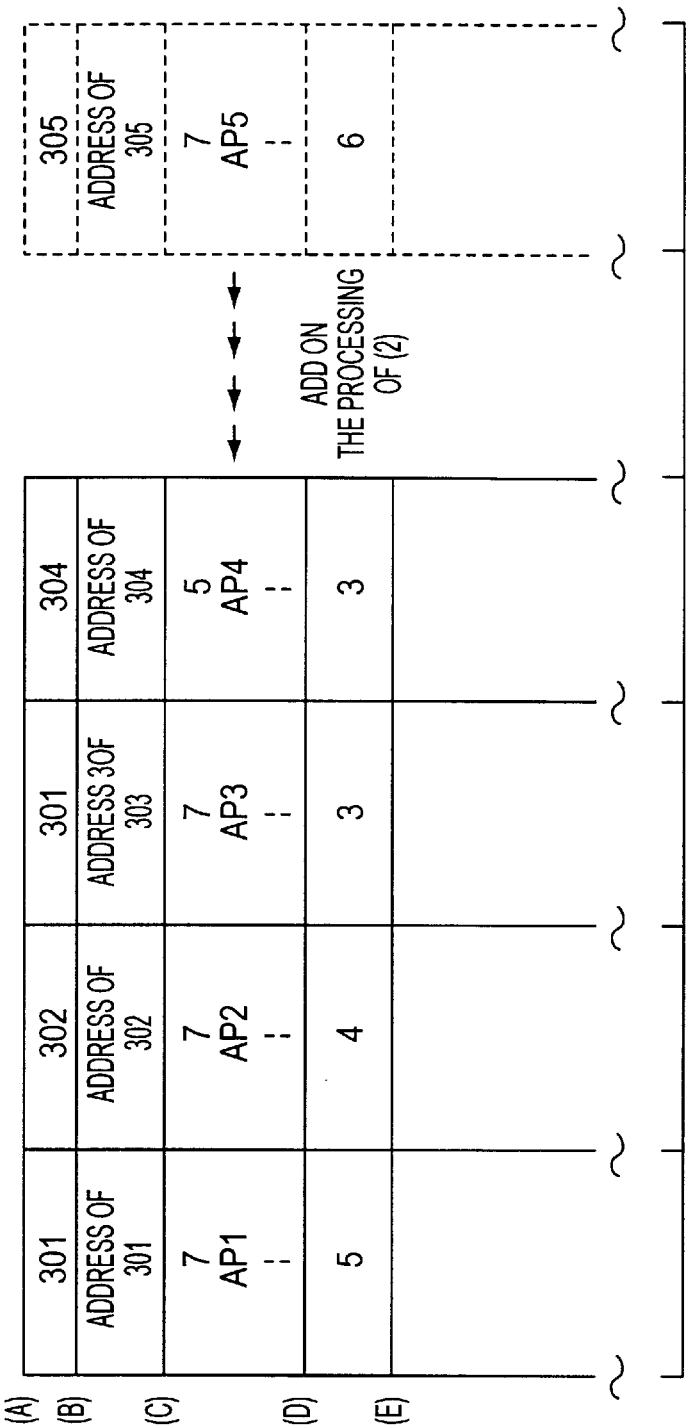
FIG. 12 illustrates a first table file of a managed node.

The managed node listed file 142 stored in the auxiliary memory 140 of the management node 100 is a file combining a table a shown in FIG. 12 and a table b shown in FIG. 13.

On both of the tables a and b, a record is formed per a column. On the table a shown in FIG. 12, each of the managed node is registered per a record. The contents registered in each record are as follows:

(a) Name of the managed node;

(b) Address of the managed node;

(c) Data group set per a managed node, which is a context data employing on the time of call establishment;

(d) Number of the belonging domain, wherein the value, which is more than 1, is registered as a group initial set number; and (e) The suitable empty areas.

The above-described context data (c) includes employed function unit, an AP name of the managed node or the like. Further, a person who creates the managed node listed file 142 should set the domain (d) with noticing a structure of a network.

On the table b shown in FIG. 13, data of (g) the managed node belonging per each record and (h) a context for generating each device are registered for all of the managed object devices (f) in the managed node. According to these information, each generation request packets for each managed object, which should be sent, are generated.

When starting management, the request management module 161 sets calls 401 to 404 from the head of the registered records shown in the table a of FIG. 12. After then, the module 161 selects the managed object device, which belongs to each of the managed nodes, from the table b of FIG. 13 to send the generation request (m-Create) of the managed object device and an inquiry packet of the operation value=X (refer to FIGS. 4 and 5).

If a managed node is added as the same as the above-described processing of (2) A PROTOCOL OF DATA DISTRIBUTION PROCESSING WHEN ADDING THE MANAGED OBJECT DEVICE:, the managed node listed file 142 is updated with the following procedure:

At first, a record enclosed with a dotted line, of which the managed node name is 305, is generated as shown in the right portion of FIG. 12. Then, the generated record is inserted behind the last record in the table a and before a table b of FIG. 13.

Secondly, an individual record is generated per the added managed object device to add to the last of the table b of FIG. 13.

Figure 14:
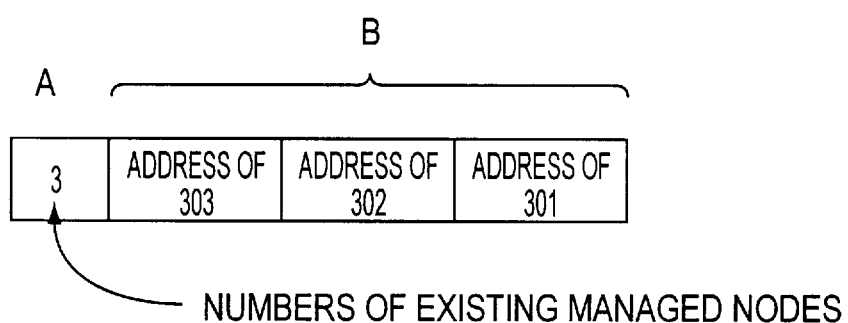
FIG. 14 shows an existing node file format generated on an managed node side.
Figure 18:
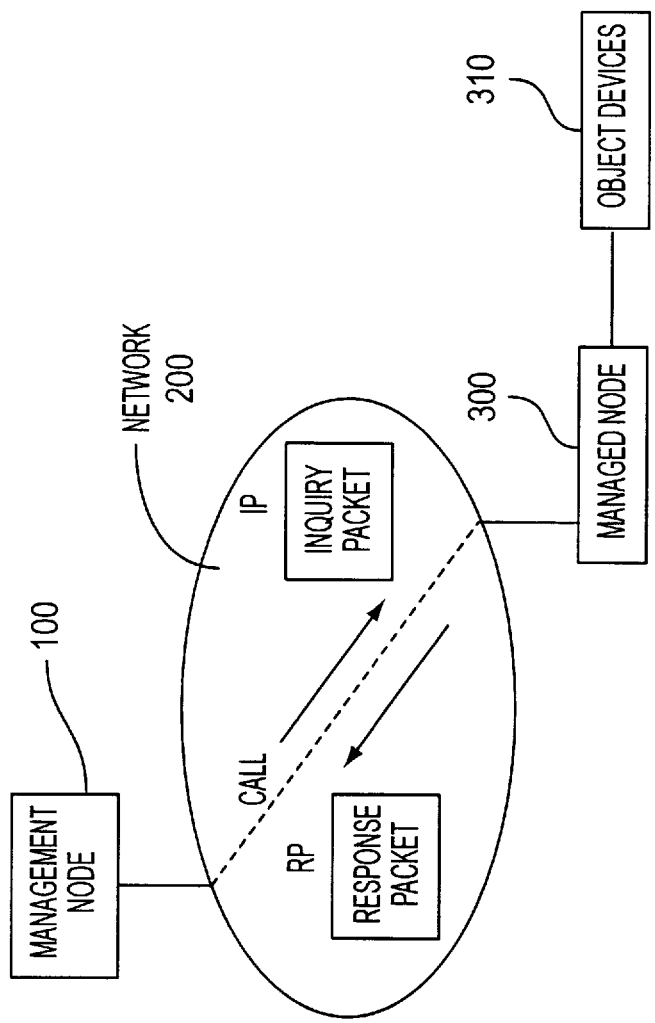
FIG. 18 is a diagram for explaining the conventional network management system.
Figure 19:
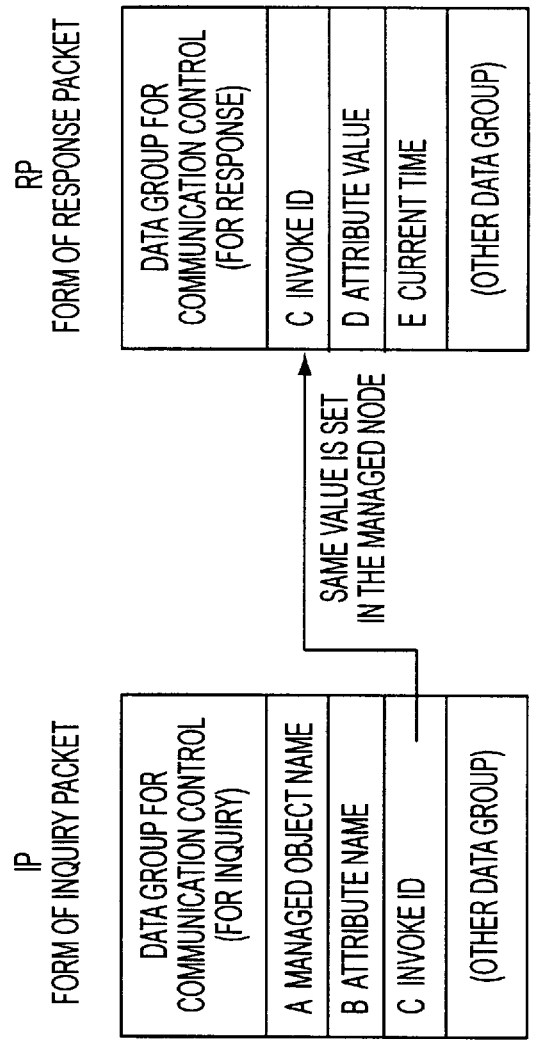
FIG. 19 is an explanatory diagram of inquiry and response packets in the prior art shown in FIG. 18.

FIG. 14 shows a format of the existing node file 342, which is generated, when receiving the inquiry packet of the operation value=X on the managed node side. The managed node counts other existing managed nodes included in the inquiry packet of the operation value=X having individual sections B, which can hold node addresses, and individual sections A for storing the number of managed node.

The counted number of the managed nodes is set to the above-described common section A, and the existing managed addresses are set to the above-described individual section B in the order of including in the inquiry packet of the operation value=X.

Accordingly, the order is reverse to the order of the records shown in the table a of FIG. 12.

More particularly, FIG. 14 shows an example of the existing node file 342, which is generated according to event flow charts of FIGS. 4 and 5.

When receiving requests of data collection from the application user 110, the request management module 161 opens only a part of the table a of the managed node listed file 142 (FIG. 12) to the memory area 131.

FIG. 15 shows a condition when tabling by opening the managed node listed file 142 to the memory 131, calculating the accumulated numbers on the above-described processing of (6) A CALCULATION OF ACCUMULATED NUMBERS AND SCHEDULING METHOD:, and setting the numbers and the group number on the appropriate table.

In FIG. 15, each record of the managed node listed file 142 explained according to FIG. 12 is an individual section (I) of the appropriate table. The group number (d) updates a group initial setting or domain number of each record of the file 142.

II) is an empty area on a file (see (e) of FIG. 12), for registering the calculated values. In the area (II), n, t, a and r are values, which are given on the steps of the processing of (6) A CALCULATION OF ACCUMULATED NUMBERS AND SCHEDULING METHOD: from specified values of the application user 110.

On the above-described processing of (4) A PROTOCOL WHEN REQUESTING A PLURALITY OF MANAGED NODES TO COLLECT WHEN RECEIVING REQUESTS in the group control module 164, calculations of the group numbers in the table shown in FIG. 15 will be performed as follows:

i) The number of d) on the above-described processing of (4) is compared with the number of the managed nodes. With the result of the comparison, the number of the managed nodes, which are required to connect each other, is obtained.

ii) The managed node having the same group initial set value as that of the domain number, which receives the collection request from the users, is researched in the order of the ascending domain numbers.

Then, a plurality of the managed node corresponding to the same domain number is searched. Thereby, a coordinate of the managed node, which can connect between the managed nodes, is searched, until coming to the above-calculated desired number.

iii) Only a group initial set number (domain number) of the managed node entered to the coordinate of the searched managed nodes is valid, and the group initial set values of other managed nodes are updated to the impossible value as the group number.

In the present embodiment, −1 is set to the managed node, which does not receive the collection request specified by the users, and 0 is set to the managed node, which receives the collection request specified by the users, as the value of the group number.

iv) The entry number "i", when calculating "time lag from the primitive period" of the above-described processing of (6) is added in the order of the searched managed nodes, so as to get values calculated on the above-described processing of (6) A CALCULATION OF THE ACCUMULATED NUMBERS AND SCHEDULING METHOD on the coordinates of the searched managed node. The above-described entry number is different from the order of the entry of the individual section to add the searched order.

Then, the request management module 161 of the management node 100 creates a bit map attached when sending the inquiry packet of the operation value=W as follows:

xi) The address data area having the suitable size is prepared, and the left bit of the left octet is employed as a controlled object bit.

xii) The managed node having the corresponding group number on the time of the inquiry of the operation value=W for certain group number, of which processing condition set with each value of the response is "normal", is searched from the last individual section of the above-described table.

xiii) Then, if the individual section is in the corresponding managed node, 1 is set to the controlled object bit of the address area, whereas 0 is set to the controlled object bit of the address area, and the controlled object bit is shifted.

xiv) On the time of finishing the above-described bit set processing till the heading individual section, 0 is padded to each bit, which is in the right section of the processing bit of the address information area.

In the example of FIG. 15, the procedures of the above-described xi) to xiv) are shown in FIG. 16. The bit corresponding to the managed nodes 303, 304 is 1 on the inquiry of the group number 3 (FIG. 16: STEP Sa). Then, the padding of 4 bits of 0 is performed to adjust the length to 1 octet (STEP Sb).

After finishing to create the address data, the request management module 161 searches the address for sending to the inquiry packet at first from the above-described address data. A bit, which becomes "1" at first, is searched in the order from the left bit of the left octet of the address data, and the unmanaged node of the individual section corresponding to the table shown in FIG. 15 is used as an address (STEP Sc).

It can be performed to clear the bits corresponding to the determined address by left shifting of the address data until the corresponding bits are overflowed and padding 0 to the empty area on the right bit side of the right octet (STEP Sd).

In the request received module 361 of the managed node, which receives the inquiry packets, the address, which is sent next, is searched from the received address data and the existing node file 342 having the same format as shown in FIG. 14.

That is, the order of the bit, which becomes "1" at first, is extracted from the left bit of the left octet of the address data. Then, the call establishment and the inquiry packets are sent towards an address in the appropriate numbered individual section in the existing node file 342.

The procedure for clearing "the bit, which becomes "1" at first", found on the address data is performed by left shifting as the same as the above-described request management module 161.

When all bits of the received address data are 0, there is no managed node, which is sent next, so that the response packet is sent to the management node 100.

The above-described event flow charts shown in FIGS. 8 to 11 show the condition of sending the inquiry packet set from the example of the table shown in FIG. 12.

When the inquiry number in the table a of FIG. 15 is n, the inquiry packet of the n+1 numbers is sent by combing the inquiry packet of the operation value=Z and the inquiry packet of the operation value=W. However, the above-described inquiry number includes the skipped inquiry packet, which specifies the heading accumulated number, because the value is 0. Therefore, the last packet is "nth inquiry packet" on the explanation of the flowing chart of FIG. 15.

Further, FIG. 17 shows one example of the packet format, which is sent from the management node 100 to the managed node 300 and the response packet format, which is sent from the managed node 300, to the management node 100, according to the present invention.

In FIG. 17, A is the request packet structure sent from the management node 100 to the managed node 300, and B is the response packet structure sent from the managed node 300 to the management node 100. A data is included in the order of the managed object name 172, the operation value 173 and the operation number 174 after the protocol header 171 and each parameter. Those are prescribed in CMISE protocol.

Further, in FIG. 17, (*1) $0_x6$, which means 6 by expressing with hexadecimal, means a type suitable to describe the managed object name. (*2) $0_x2$ means integer type. (*3) $0_x30$ shows that the structural body of number is formed. (*4) $0_x3$ shows a bit sequence type. Further, it is predetermined between both communication nodes that the attribute value structure is like the response packet B for (*5) a.

As described above, according to the present invention, the management node 100 sends the inquiry packet by specifying the suitable accumulated numbers, and the managed node 300 sends the management node by piling the collected data into one response packet after collecting data required for the above-described accumulated numbers with the specified time interval.

Accordingly, it becomes possible to delete the number of packets flowing on the network according to the above-described structure, delete the data amount flowing on the network, and provide a network management and data collection system for distributing load on the network.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced.

What is claimed is:

1. A network management and data collection system including a network, a plurality of managed nodes operatively connected to the network and a management node operatively connected to the network for accessing to the plurality of managed nodes via the network, the network management and data collection system comprising:

an accessing circuit provided in the management node for calculating an amount of collection data, which can be sent in lump-sum from an accessed, managed node, based on an allowable response time and a network delay value, and sending to the accessed managed node, a request signal including an instruction that the accessed managed node collects and accumulates data up to the calculated amount of collection data; and a responding circuit provided in each of the plurality of managed nodes for collecting and accumulating data, and periodically sending the data accumulated up to the calculated amount of collection data in lump-sum to the management node, responding to the request signal sent from the accessing circuit.

2. The network management and data collection system according to claim 1;

wherein the responding circuit determines load condition obtained from a network control module provided in the accessed managed node, and sends the accumulated data to respond to the request signal sent form the accessing circuit, by adding time data, after a predetermined time has elapsed in the case of high load condition, and the management node includes an analyzing circuit for judging the load condition of the accessed managed node, based on a response sent from the accessed managed node, and employs the added data as a log.

3. The network management and data collection system according to claim 1;

wherein each of the plurality of managed nodes includes a memory circuit for accumulating collected data as well as time data, in the case where the collected data is different from previously collected data, and omitting the accumulation of data in the case where the collected data is the same as the previously collected data, and the management node confirms if there is an omitted collected data, based on the time data attached to the collected data, and recoveries the omitted, collected data with the same data as previously collected data.

4. The network management and data collection system according to claim 1;

wherein the management node includes a scheduling circuit for shifting intervals of returning responses from the plurality of managed nodes, by converting an entry order of each accessed managed node to a binary number, and taking the sum of fractions corresponding to figures of "1" of the binary number to change the number of accumulated data in a first response to a first request to the accessed, managed node.

5. A network management and data collection system including a circuit network, a plurality of managed nodes operatively connected to the circuit network and a management node operatively connected to the circuit network for accessing to the plurality of the managed nodes, the network management and data collection system comprising: a first initial registering request circuit provided in the management node for requesting the plurality of the managed nodes to manage a list of managed object devices connected to the managed nodes, in an order reversed to a noticed order, which has already been notified;

a first accessing circuit provided in the management node for creating an address data of a bit map indicating managed nodes, which are requested to collect data, selecting a managed node, to which a first request of collecting the data is sent and inquiring a collecting request with a created address data of the bit map to a selected managed node; and a second initial registering request circuit for storing a list of the managed nodes in a registered order to an initial registering request sent from the first initial registering request circuit; and a second accessing circuit for comparing the address data of the bit map, which is attached, when receiving an inquiry, with a list of the managed object devices on the time of initial registration, and generating a daisy chain of inquiries.

6. The network management and data collection system according to claim 5;

wherein the second accessing circuit transfers an inquiry to other managed nodes, attaching address data, which is edited by shifting the node data and bit map in order to generate the daisy chain of inquiries.

7. The network management and data collection system according to claim 5;

wherein the second accessing circuit notifies a report to the management node as a response and generates a daisy chain of the inquiries.

8. The network management and data collection system according to claim 5;

wherein the managed node further includes a network accessing circuit for responding reference condition of managed object devices and load condition of a communication control module in a current node to an inquiry for starting the collection of data, and the management node refers further includes a managed node administration circuit for referring times per each managed node and monitors the managed node, in which delay occurs, when receiving a response returned from the inquiry chain with storing each condition included in the response as initial value, removes the corresponding managed node from the bit map of the address data, and sends an inquiry of the collection request, which is different from the inquiry for generating a daisy chain to the managed node, as the load is generated in the managed node, and registering the corresponding managed node to the address data of the inquiry for generating daisy chain again, when the inquiry of the other collection request is responded without delaying.

9. A network management and data collection system including a circuit network, a plurality of managed nodes operatively connected to the circuit network and a management node operatively connected to the circuit network for accessing the plurality of the managed nodes, the network management and data collection system comprising:

an accessing circuit provided in the management node for calculating an amount of collection data, which can be sent in lump-sum from an accessed, managed node, based on an allowable response time and a network delay value, and sending to the accessed managed node, a request signal including an instruction that the accessed managed node collects and accumulates the amount of data; and a responding circuit provided in each of the plurality of the managed nodes for periodically collecting and accumulating data, and sending the accumulated data in lump-sum to the management node, responding to the request signal sent from the accessing circuit;

wherein the management node includes;

an initial registering circuit for storing a list of the managed nodes in the request order to the initial registering request sent from the initial registering request circuit of the managed node;

a second accessing circuit for comparing address data attached when receiving the inquiry with a list of the other managed nodes, and generating a daisy chain of the inquiries; and a schedule auxiliary circuit for comparing numbers of responses received in one request with numbers of the collected object managed nodes, judging how many connections of the daisy chain of the inquiries on the first circuit of the managed node are required, selecting coordinates of the managed node for connecting between the managed nodes from the domain number belonging to each managed node on a table for managing the managed nodes, searching the contents of the requests according to the inquiries, of which operation value is different from that of the non-selected managed nodes, and then obtaining opportunity of sending the inquiries for the managed nodes for connecting between the managed nodes by a suitable time period time out notification.

* * * * *